United States Patent
Bleyer et al.

(10) Patent No.: US 10,997,728 B2
(45) Date of Patent: May 4, 2021

(54) 2D OBSTACLE BOUNDARY DETECTION

(71) Applicant: MICROSOFT TECHNOLOGY LICENSING, LLC, Redmond, WA (US)

(72) Inventors: Michael Bleyer, Seatte, WA (US); Yuri Pekelny, Seattle, WA (US); Raymond Kirk Price, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 16/389,621

(22) Filed: Apr. 19, 2019

(65) Prior Publication Data

US 2020/0334823 A1  Oct. 22, 2020

(51) Int. Cl.
| | |
|---|---|
| G06T 19/00 | (2011.01) |
| G06T 7/13 | (2017.01) |
| G06T 7/593 | (2017.01) |
| G06F 3/01 | (2006.01) |
| G06T 11/00 | (2006.01) |
| G06T 7/521 | (2017.01) |

(52) U.S. Cl.
CPC ............ *G06T 7/13* (2017.01); *G06F 3/012* (2013.01); *G06T 7/593* (2017.01); *G06T 11/00* (2013.01); *G06T 19/006* (2013.01); *G06T 7/521* (2017.01); *G06T 2207/10012* (2013.01); *G06T 2207/10028* (2013.01)

(58) Field of Classification Search
None
See application file for complete search history.

(56) References Cited

U.S. PATENT DOCUMENTS

| | | |
|---|---|---|
| 9,836,483 B1 | 12/2017 | Hickman et al. |
| 9,934,590 B1 | 4/2018 | Cheng et al. |
| 9,996,974 B2 | 6/2018 | Reisner-Kollmann et al. |
| 2005/0015201 A1 | 1/2005 | Fields et al. |
| 2015/0092015 A1 | 4/2015 | Stafford |
| 2016/0026253 A1 | 1/2016 | Bradski et al. |

(Continued)

FOREIGN PATENT DOCUMENTS

WO  2016191051 A1  12/2016

OTHER PUBLICATIONS

Fortin et al. "Handling Occlusions in Real-time Augmented Reality : Dealing with Movable Real and Virtual Objects" Dec. 2006, IEEE, 1-8 (Year: 2006).*

(Continued)

*Primary Examiner* — Robert J Craddock
(74) *Attorney, Agent, or Firm* — Workman Nydegger

(57) ABSTRACT

Techniques are provided to dynamically generate and render an object bounding fence in a mixed-reality scene. Initially, a sparse spatial mapping is accessed. The sparse spatial mapping beneficially includes perimeter edge data describing an object's edge perimeters. A gravity vector is also generated. Based on the perimeter edge data and the gravity vector, two-dimensional (2D) boundaries of the object are determined and a bounding fence mesh of the environment is generated. A virtual object is then rendered, where the virtual object is representative of at least a portion of the bounding fence mesh and visually illustrates a bounding fence around the object.

18 Claims, 21 Drawing Sheets

(56) References Cited

U.S. PATENT DOCUMENTS

| | | |
|---|---|---|
| 2016/0171771 A1 | 6/2016 | Pedrotti et al. |
| 2018/0261067 A1 | 9/2018 | Bostick et al. |
| 2019/0033989 A1 | 1/2019 | Wang et al. |
| 2019/0139403 A1 | 5/2019 | Alam et al. |
| 2019/0188906 A1 | 6/2019 | Krishna et al. |

OTHER PUBLICATIONS

Cloix, et al."Obstacle and Planar Object Detection Using Sparse 3D Information for a Smart Walker", In Proceedings of International Conference on Computer Vision Theory and Applications, Jan. 5, 2014,8 Pages.

Díaz-Vilariño, L, et al."Indoor Navigation from Point Clouds: 3D Modelling and Obstacle Detection", In Proceedings of International Archives of the Photogrammetry, Remote Sensing and Spatial Information Sciences, vol. XLI-B4, Jul. 12, 2016,pp. 275-281.

Fathi, et al."Automated sparse 3D point cloud generation of infrastructure using its distinctive visual features", In Journal of Advanced Engineering Informatics, vol. 25, Issue 4, Oct. 2011,2 Pages.

Kanamori, et al."Obstacle Avoidance Method in Real Space for Virtual Reality Immersion", In Proceedings of IEEE International Symposium on Mixed and Augmented Reality, Oct. 2018,pp. 80-89.

"UploadVR: Oculus Rift S Introduction Experience First Steps", Retrieved From: https://www.youtube.com/watch?v=PQVI8XIy4r0, Apr. 4, 2019, 5 Pages.

Heaney, David, "Here's How You Set Up Guardian on Rift S and Oculus Quest, and What Happens After—UploadVR", Retrieved From: https://uploadvr.com/heres-how-you-set-up-guardian-on-rift-s-and-oculus-quest-and-what-happens-after/, Apr. 5, 2019, 7 Pages.

"International Search Report and Written Opinion Issued in PCT Application No. PCT/US20/023035", dated Aug. 12, 2020, 18 Pages.

Scavarelli, et al., "VR Collide! Comparing Collision-Avoidance Methods Between Co-located Virtual Reality Users", In Proceedings of the CHI Conference Extended Abstracts on Human Factors in Computing Systems, May 6, 2017, pp. 2915-2921.

"Non Final Office Action Issued in U.S. Appl. No. 16/917,255", dated Jan. 22, 2021, 9 Pages.

\* cited by examiner

2D OBSTACLE BOUNDARY DETECTION

BACKGROUND

Mixed-reality (MR) systems/devices include virtual-reality (VR) and augmented-reality (AR) systems. Conventional VR systems create completely immersive experiences by restricting users' views to only virtual images rendered in VR scenes/environments. Conventional AR systems create AR experiences by visually presenting virtual images that are placed in or that interact with the real world. As used herein, VR and AR systems are described and referenced interchangeably via use of the phrase "MR system." As also used herein, the terms "virtual image," "virtual content," and "hologram" refer to any type of digital image rendered by an MR system. Furthermore, it should be noted that a head-mounted device (HMD) typically provides the display used by the user to view and/or interact with holograms provided within an MR scene.

An MR system's HMD typically includes a head tracking camera system having one or more head tracking camera(s) and an inertial measurement unit (IMU). Using these cameras, the head tracking system can determine the HMD's position and pose relative to its surrounding environment. Data from the IMU can be used to augment or supplement the camera data to provide a more reliable position and pose determination.

The HMD's position and pose are both relied upon by an MR system when visually placing/rendering holograms in an MR scene. For instance, using Simultaneous Location And Mapping (SLAM), the MR system's head tracking and IMU units can calculate and determine a user's position as the user moves through space and can provide immediate display corrections for the virtual content in the MR scene.

To improve the virtual content placement process, MR systems also use three-dimensional (3D) sensing technologies to map the space around the HMD. This spatial information is used to provide contextual information to the user (e.g., for obstacle avoidance) and to help accurately place holograms. Unfortunately, the requirements for head tracking cameras and 3D image sensors are quite different and vary among MR systems.

Currently, head tracking is often performed using a stereo camera system that relies on low resolution visible light. For instance, common configurations of these stereo camera systems have a resolution of about 640×480 pixels. With lower resolution camera systems, it is particularly difficult to generate a full surface reconstruction (or a "spatial mapping") of the HMD's environment. Having an incomplete spatial mapping results in poor obstacle detection and avoidance and thus a lower quality user experience. Consequently, there is a significant need to improve how obstacles are identified within an environment, especially when only a lower resolution spatial mapping is available for that environment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments relate to methods, systems, and wearable devices that dynamically generate and render an object bounding fence in an MR scene.

In some embodiments, a sparse spatial mapping of an environment is initially accessed, where the sparse spatial mapping describes the environment in a 3D manner and where the environment includes a particular object. The sparse spatial mapping beneficially includes perimeter edge data describing the object's outer perimeters or boundaries. A gravity vector of a head-mounted device (HMD), which is rendering the MR scene, is also generated. Based on the perimeter edge data and the gravity vector, one or more two-dimensional (2D) boundaries of the object are determined (e.g., a 2D planar area is identified for the object). Then, a bounding fence mesh, a 2D mesh, or 2D spatial mapping of the environment is generated. This bounding fence mesh identifies the 2D boundaries of the object. Additionally, a virtual object is rendered within the MR scene. This virtual object is representative of at least a portion of the bounding fence mesh and also visually illustrates a bounding fence around the object.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
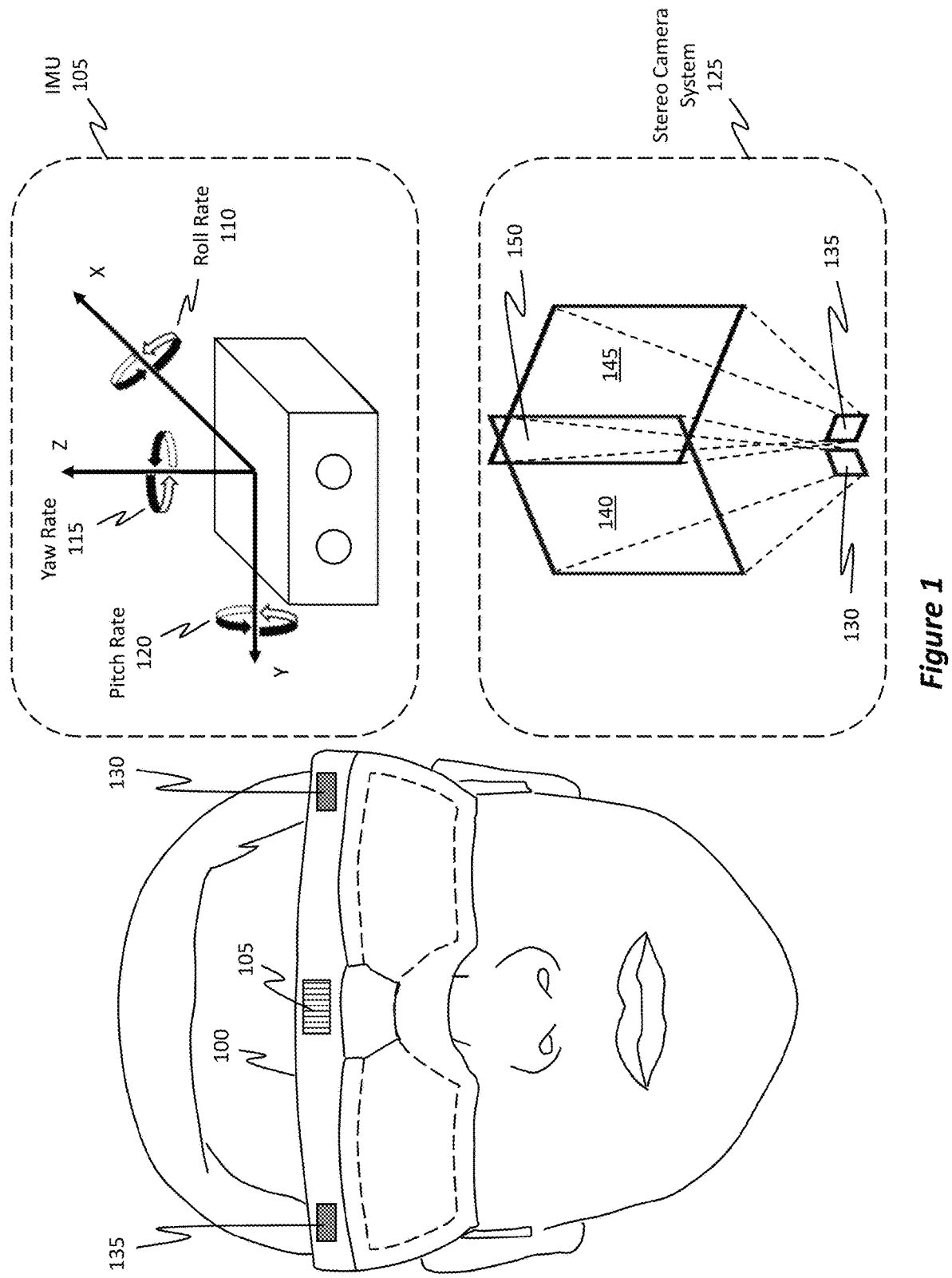
FIG. 1 illustrates an example of a head-mounted device (HMD) and how an HMD can include an inertial measurement unit (IMU) and a stereo camera system.

The disclosed embodiments relate to methods, systems, and wearable devices that dynamically generate and render an object bounding fence in a mixed-reality (MR) scene/environment.

In some embodiments, a sparse "spatial mapping" is accessed. As used herein, the phrase "spatial mapping" refers to a three-dimensional digital representation of an object or environment, and the phrase "sparse spatial mapping" refers to an incomplete spatial mapping having a reduced number of 3D data points, or rather, reduced surface or texture data relative to a "complete" or "robust spatial mapping." Although sparse, the sparse spatial mapping does include an adequate amount of perimeter edge data so as to sufficiently describe or identify the perimeters/boundaries of a particular object (e.g., by identifying at least a part of the object's length, width, and height). A gravity vector is also generated. Based on the perimeter edge data and the gravity vector, the object's two-dimensional (2D) boundaries (e.g., length and width) are determined and a bounding fence mesh, a 2D mesh, or 2D spatial mapping of the environment is generated. In some cases, a bounding fence mesh can also be considered to be a virtual 3D object representing an object's perimeter edges. A virtual object is also rendered, where the virtual object is representative of at least a portion of the bounding fence mesh and is provided in order to visually illustrate the object and a bounding fence enveloping/surrounding the object.

Technical Benefits, Improvements, and Advantages

It will be appreciated from this disclosure that the disclosed embodiments can be used to help improve the technical field of mapping environments for mixed-reality applications and for projecting holograms in mixed-reality environments in numerous ways, some of which are outlined at a high level in this section while other benefits and improvements are described throughout the remaining portions of this disclosure.

As an initial matter, it is noted that many MR systems in the market today use lower resolution cameras to perform head tracking and depth calculations. Consequently, the resulting spatial mappings, which are often derived from the head tracking data, are also of lower quality and resolution. Using lower resolution spatial mappings often results in a reduced ability for the user to understand an environment and for the MR system to detect obstacles within the environment. As such, it may be the case that users of these traditional MR systems collide with real-world objects while immersed in an MR scene. It is also often the case that traditional MR systems consume a large amount of system bandwidth and have high computational complexity, resulting in high power consumption.

The addition of higher quality cameras or depth sensors represents a significant cost both in terms of hardware and battery expenditure. For very low-cost MR systems (e.g., systems that do not have the budget to afford the additional bill of materials for depth sensors), only a passive stereo camera pair might be used to perform head tracking and to generate depth images. Unfortunately, the low angular resolution of these passive camera systems (e.g., approximately 8 pixels per degree) and lack of additional illumination texture to the scene (hence a "passive" system as opposed to an "active" system that may provide additional illumination texture) provides low or insufficient information to generate a full, complete, dense, or robust spatial mapping of the environment. Indeed, in many cases, these low-resolution camera systems are often able to detect (at best) only an object's edge perimeters (i.e. the outer boundaries of an object). As such, traditional systems have been quite inadequate to build a high-density point cloud dataset with high resolution surface reconstruction, resulting in the inability to perform reliable, repeatable, and accurate obstacle avoidance.

In contrast, the disclosed embodiments are able to provide reliable, repeatable, and accurate obstacle avoidance. These benefits are achieved even when only a lower resolution spatial mapping is available. To achieve these benefits, the embodiments translate, transform, or compress three-dimensional (3D) data to generate a much simpler 2D image or 2D spatial mapping of the environment. This translation may be achieved by removing, discarding, or filtering out the object's height dimension relative to a determined gravity vector. To clarify, once the 3D dimension has been removed, then the embodiments are left with a 2D image and can determine whether any given pixel in the 2D image is occupied or not occupied, which is a much simpler binary determination when performing obstacle avoidance.

The resulting 2D image can be thought of as a type of bounding fence mesh, a 2D mesh, or 2D spatial mapping (which was generated using head tracking data, as described above). In some cases, a bounding fence is representative of a geometrical 3D structure representing an object's 2D perimeter edges. The disclosed embodiments also use this bounding fence mesh to generate a "fence" around objects in order to clearly define the environment's play-space or movement area (i.e. the area where a user can move without fear of colliding into an object). Furthermore, the generation of a "fence" is much less computationally expensive than performing the calculations required to generate a full high-density surface reconstruction mesh of the scene.

Accordingly, the disclosed embodiments use fewer computing resources, thereby improving the efficiency of the computing system/device or enabling the experiences to run successfully on a lower-cost computing system (e.g., an HMD). Furthermore, with these reduced computations, the embodiments operate to preserve or expand the battery lifespan of the computing system. In this manner, the disclosed embodiments provide a real-world, practically applicable solution to a technical problem in the computing arts, all while improving computing efficiency and prolonging battery life. Furthermore, the disclosed embodiments utilize a highly compressed way to represent surface reconstruction by storing and using only a single 2D image (i.e. a bounding fence mesh/2D mesh/spatial mapping) as opposed to storing and using an entire 3D mesh.

Head-Mounted Devices (HMD)

Attention will now be directed to FIG. 1, which illustrates an HMD 100 capable of performing the disclosed operations. HMD 100 is included as a part of an MR device (which will be illustrated later in connection with FIG. 20). The phrases "MR device" and "MR system" can be used interchangeably with one another. In some cases, HMD 100 is itself considered an MR device. Therefore, references to HMDs, MR devices, or MR systems generally relate to one another and may be used interchangeably.

HMD 100 is shown as including an IMU 105. IMU 105 is a type of device that measures force, angular adjustments/rates, orientation, acceleration, velocity, gravitational forces, and sometimes even magnetic fields. To do so, IMU 105 may include any number of data acquisition devices, which include any number of accelerometers, gyroscopes, or even magnetometers.

Figure 2:
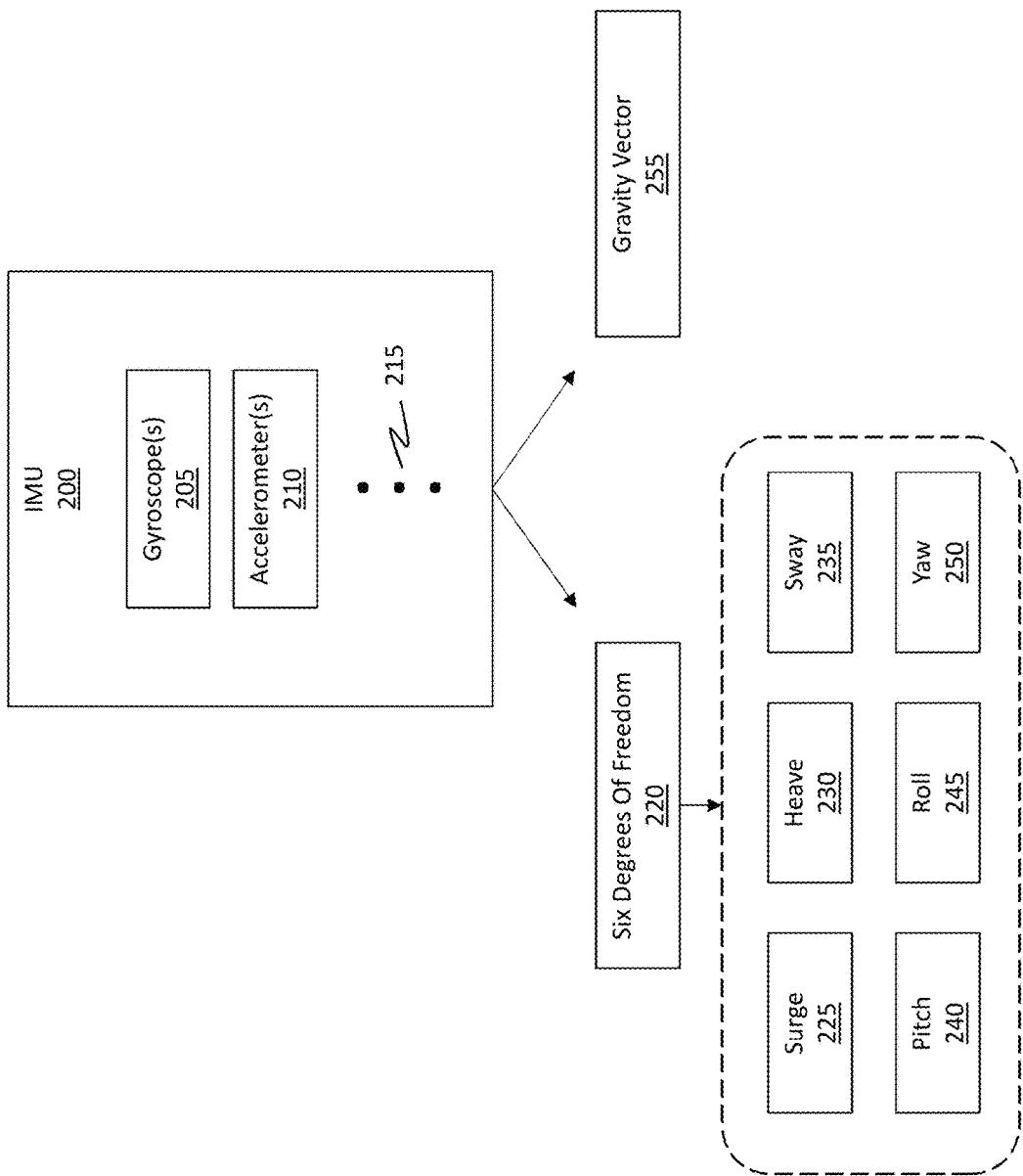
FIG. 2 illustrates how the IMU can be used to determine an orientation of the HMD and to determine a gravity vector.

IMU 105 can be used to measure a roll rate 110, a yaw rate 115, and a pitch rate 120. It will be appreciated, however, that IMU 105 can measure changes in any of the six degrees of freedom, as shown in FIG. 2. That is, FIG. 2 shows an IMU 200, which is representative of IMU 105 from FIG. 1. IMU 200 includes one or more gyroscope(s) 205 and one or more accelerometer(s) 210. The ellipsis 215 demonstrates how IMU 200 may include other types of data acquisition units whose data can be used to determine an HMD's position, orientation, movement, and pose.

IMU 200 is able to determine its position in any one or more of the six degrees of freedom 220, which refers to the ability of a body to move in three-dimensional space. Six degrees of freedom 220 include surge 225 (e.g., forward/backward movement), heave 230 (e.g., up/down movement), sway 235 (e.g., left/right movement), pitch 240 (e.g., movement along a transverse axis), roll 245 (e.g., movement along a longitudinal axis), and yaw 250 (e.g., movement along a normal axis). Accordingly, IMU 200 can be used to measure changes in force and changes in movement, including any acceleration changes. This collected data can be used to help determine a position, pose, and/or perspective of an HMD relative to its environment.

Furthermore, this data, along with the data from the one or more gyroscope(s) 205 can be used to determine a gravity vector 255 of the HMD 100 and for the objects in the scene from FIG. 1. As used herein, references to a "gravity vector" refer to a vector that is parallel to the gravity force of the earth. That is, assuming that any particular position on the earth can be thought of as a flat surface, the gravity vector will be perpendicular to the flat surface and will be directed downward. Therefore, regardless of any movement of the HMD 100 from FIG. 1, IMU 200 (and IMU 105) can be used to determine gravity vector 255 (i.e. the gravity vector is generated based on data obtained from the IMU 200).

Returning to FIG. 1, HMD 100 also includes a stereo camera system 125, which includes a first camera 130 (e.g., perhaps a head tracking camera) and a second camera 135 (also perhaps a head tracking camera). Multiple cameras are typically used for Head Tracking as to increase the effective field of view of the system. Camera 130 includes its corresponding field of view (FOV) 140 (i.e. the observable area of first camera 130, or rather the observable angle through which first camera 130 is able to capture electromagnetic radiation), and camera 135 includes its corresponding FOV 145. While only two cameras are illustrated, it will be appreciated that any number of cameras may be included in stereo camera system 125 (e.g., 1 camera, 2, 3, 4, 5, or more than 5 cameras).

Cameras 130 and 135 can be any type of camera. In some cases, cameras 130 and 135 may be stereoscopic cameras in which a part of FOVs 140 and 145 overlap (e.g., see overlap 150) with one another to provide stereoscopic camera operations (e.g., head tracking). In some implementations, cameras 130 and 135 are able to capture electromagnetic radiation in the visible light spectrum and generate visible light images. In other or additional implementations, cameras 130 and 135 are able to capture electromagnetic radiation in the infrared (IR) spectrum and generate IR light images. In some cases, cameras 130 and 135 include a combination of visible light sensors and IR light sensors. In yet other cases, cameras 130 and 135 can be repurposed or multi-purposed for depth detection functionalities for generating a 3D point cloud of the environment. As an example, when an object is located within overlap 150, the object's depth can be calculated by identifying differences or disparities between the two images that concurrently capture the same object. Because the same object is captured in both images, the disparities can be used to determine the 3D point cloud of the scene. Further details on cameras will be provided later in connection with FIG. 6.

Displaying Virtual Content/Images

Figure 3:
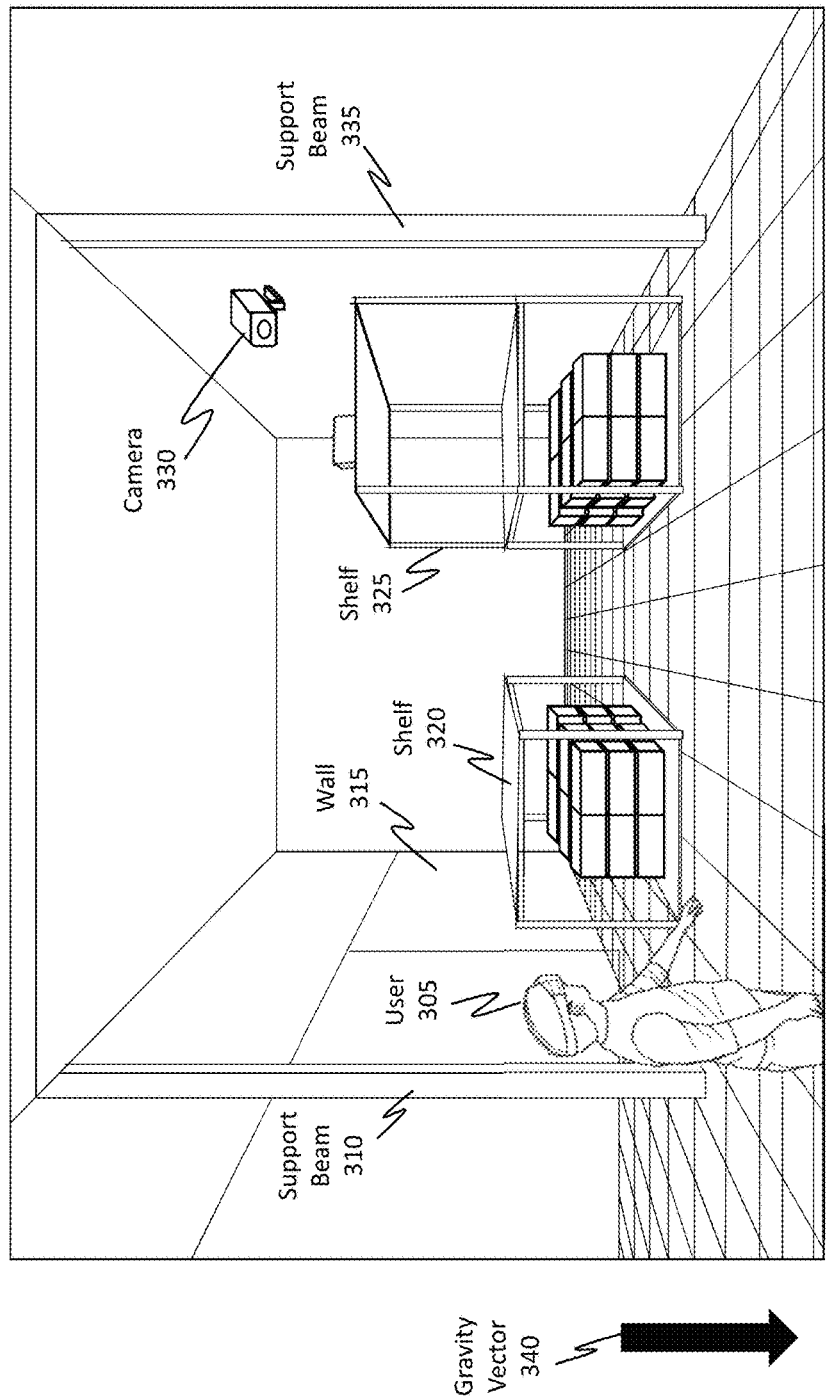
FIG. 3 illustrates an HMD in an environment and a gravity vector for the HMD.

FIG. 3 illustrates a real-world environment 300 in which a user 305 is located. Here, a user 305 is wearing an HMD, like HMD 100 of FIG. 1. Environment 300 is shown as including a number of real-world objects, such as support beam 310, wall 315, shelf 320, shelf 325, camera 330, and support beam 335. FIG. 3 also shows how the user's HMD is able to determine the gravity vector 340 for the real-world environment 300. Furthermore, regardless of whether user 305 is viewing or interacting with virtual content in a VR scene or an AR scene, it is desirable to identify objects within the real-world environment 300 to ensure that the user 305 does not inadvertently collide with those objects.

Figure 4:
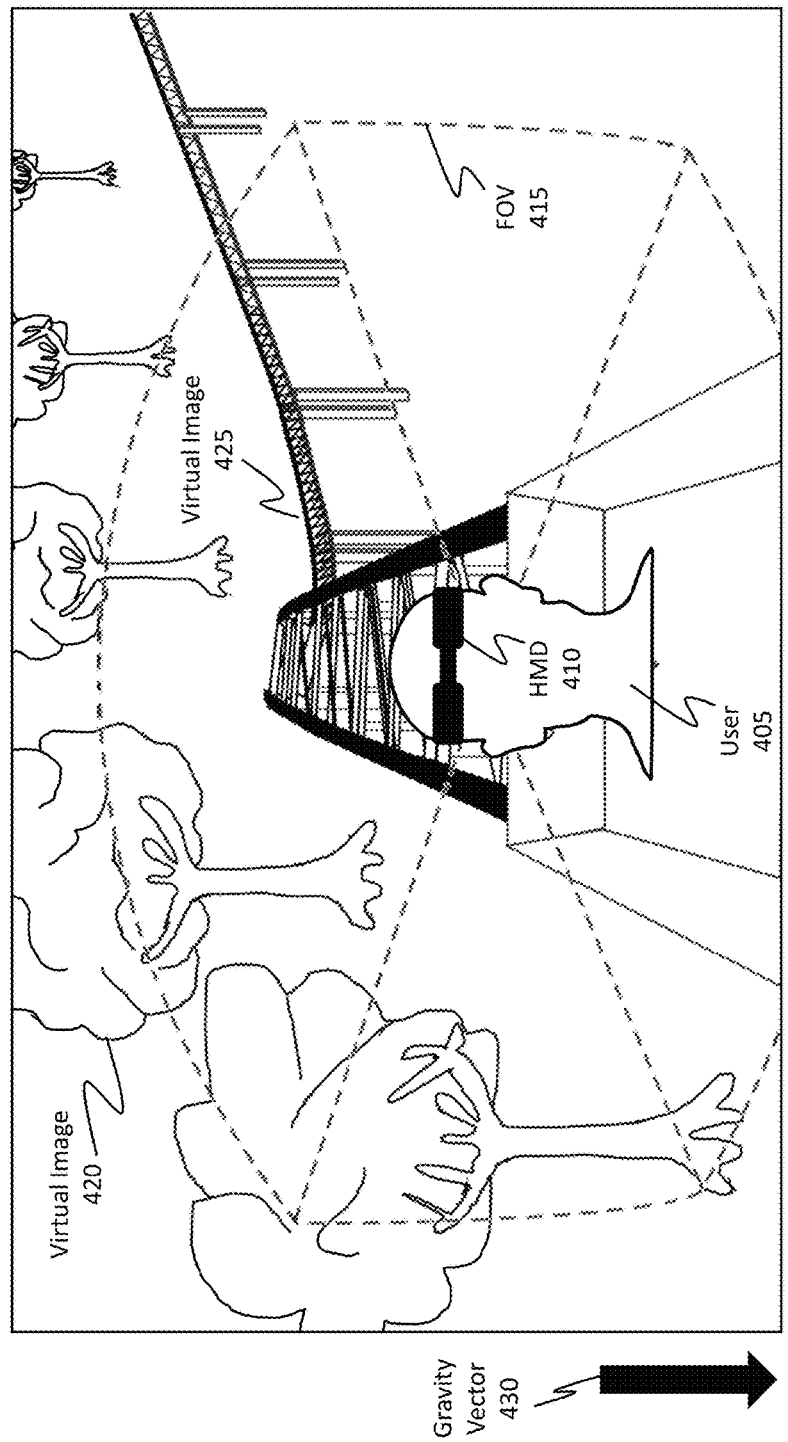
FIG. 4 illustrates an example of a mixed-reality environment in which the user is interacting with virtual content.

As an example, FIG. 4 shows a mixed-reality environment 400 that may be projected by an HMD. In this scenario, the mixed-reality environment 400 is a type of VR environment because the user's FOV of the real world is entirely occluded. FIG. 4 shows a user 405, who is representative of user 305 from FIG. 3. Also shown is HMD 410, which is representative of the HMDs discussed thus far. HMD 410 is shown as having a corresponding FOV 415, and mixed-reality environment 400 is shown as including any number of virtual images (e.g., virtual image 420 and virtual image 425). Also shown is the gravity vector 430 corresponding to the real-world environment (but not necessarily corresponding to the mixed-reality environment 400). In some cases, the gravity vector 430 may be different than a simulated gravity vector for the mixed-reality environment 400.

Figure 5:
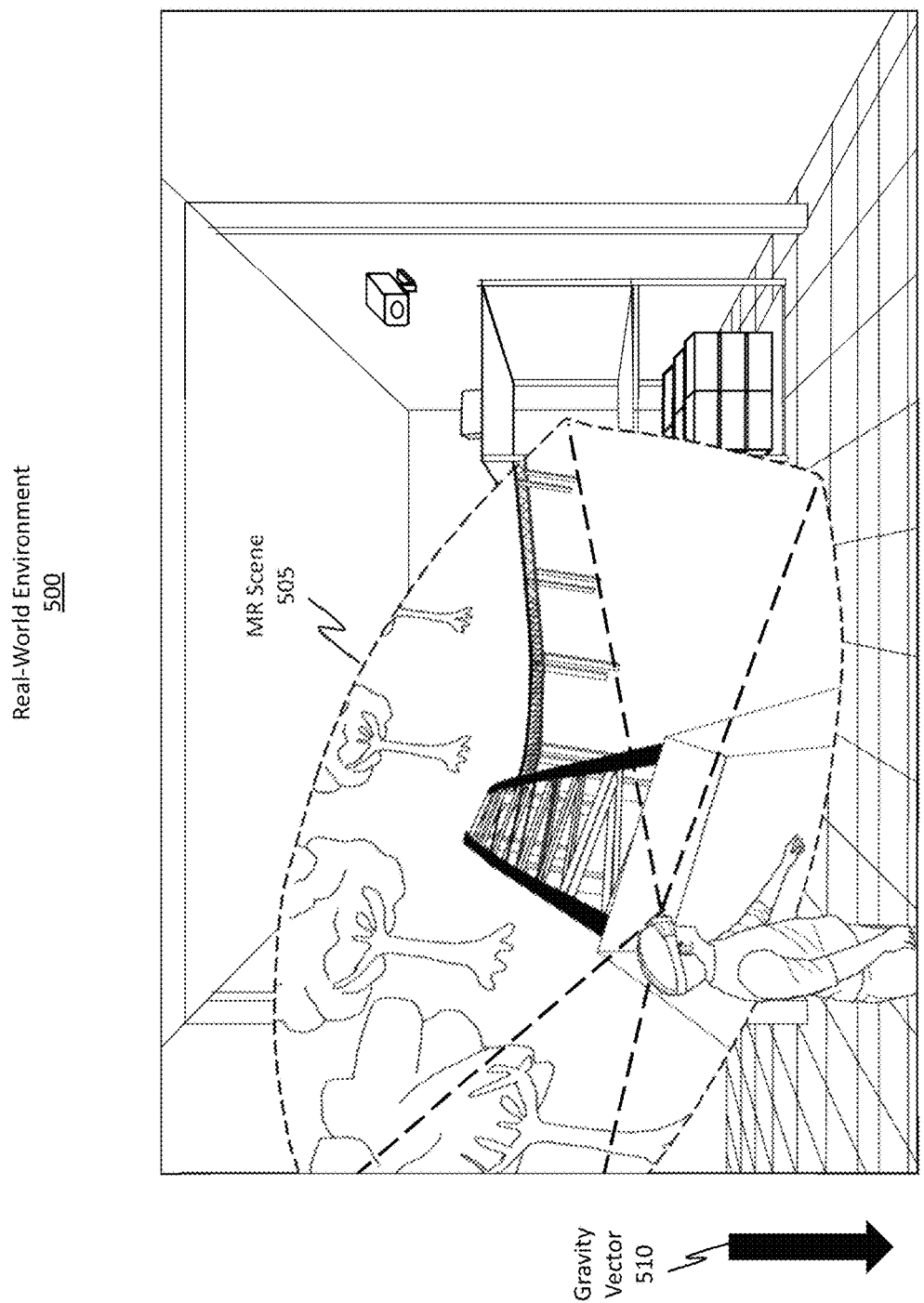
FIG. 5 illustrates a user immersed in a mixed-reality environment.

FIG. 5 again shows the real-world environment 500, which is representative of the real-world environments discussed earlier. Here, the user's HMD is shown as projecting an MR scene 505, which is representative of the mixed-reality environment 400 of FIG. 4. Furthermore, even though the VR scene is tilted (e.g., because the rollercoaster is banking) and the MR scene 505 is shown as having a tilt, the gravity vector 510 (corresponding to the real-world environment 500) is shown as being unchanged in that the gravity vector 510 is always in a same direction as the earth's gravity.

Camera Systems

To properly display virtual content and to avoid obstacles, it is beneficial to use camera data obtained from the HMD's cameras (e.g., head or hand tracking cameras). This camera data is used to map out the user's environment in order to determine where and how to place virtual content. Furthermore, this camera data is used to determine the depths and textures of objects within the user's environment as well as the distances of the objects from the user or HMD. In this regard, the camera data is not only useful for placing holograms, but it is also useful to warn the user when the user is about to collide with an object in the real-world.

Figure 6:
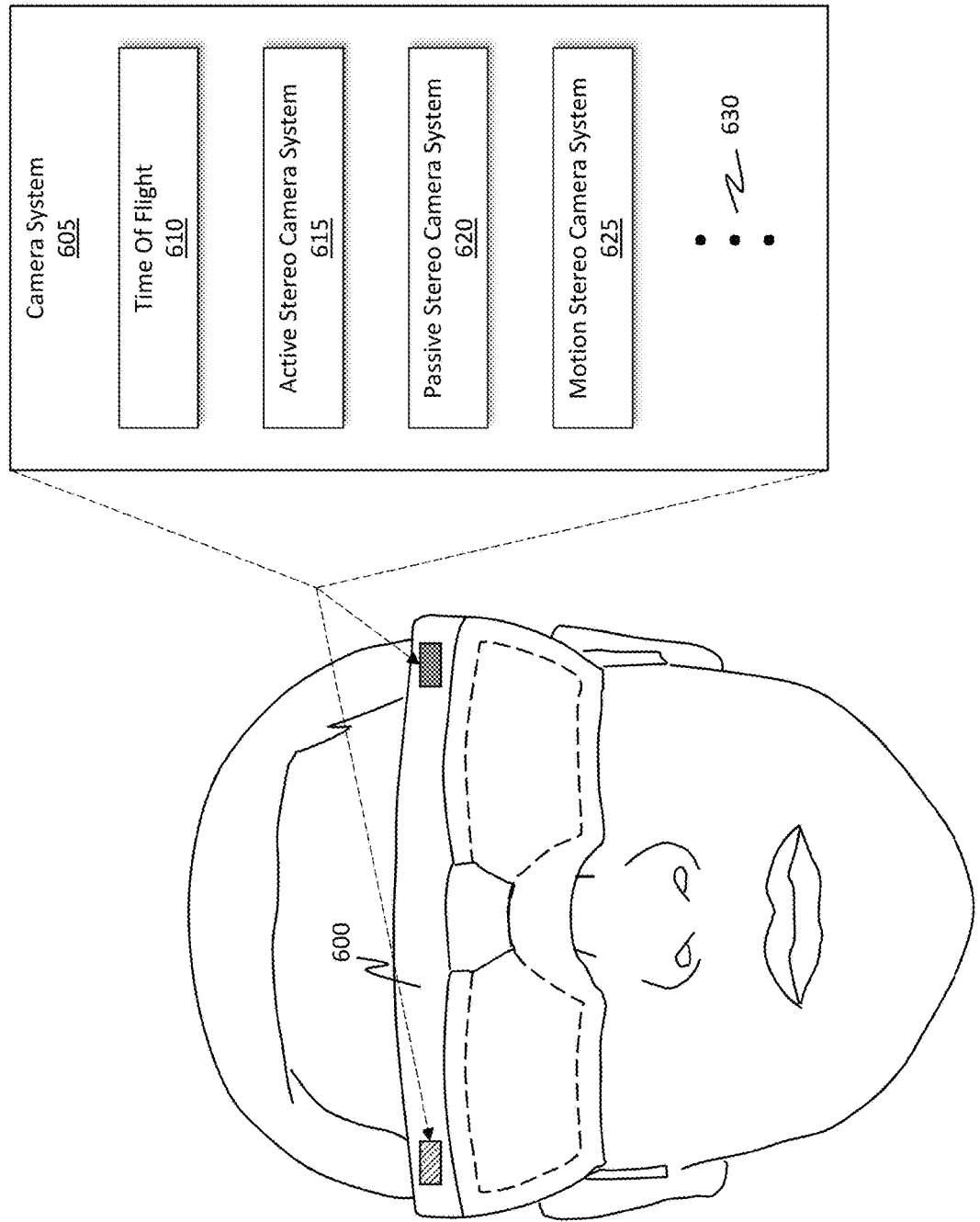
FIG. 6 illustrates an embodiment of an HMD, which can include different types of camera systems for performing 3D estimation.

It will be appreciated that any number and type of camera may be used, either individually or in combination (e.g., multiple cameras of multiple types). FIG. 6 shows HMD 600, which is representative of the earlier HMDs discussed thus far. HMD 600 is shown as including a camera system 605, which may be representative of stereo camera system 125 from FIG. 1 and which may be included as a part of a head or hand tracking camera system.

Camera system 605, which can be used to generate a 3D point cloud of the space/environment, can include one or more of the following different types of cameras: a time of flight camera 610 (e.g., an active time-of-flight), an active stereo camera system 615 (e.g., an active structure light camera), a passive stereo camera system 620, or a motion stereo camera system 625. The ellipsis 630 demonstrates how other types of camera systems may be included as well. For instance, a single pixel laser depth device can be used to scan a room and can contribute in generating depth data for a spatial mapping. As another example, a user's phone may be used as the camera system and can determine a gravity vector. Additionally, other external cameras or sensors may be used to contribute data when generating a spatial mapping. These cameras are beneficially used to determine depth within the user's environment, including any texture and surface data of objects within that environment.

Time of flight camera 610 and active stereo camera system 615 are typically used to actively scan and illuminate the environment in order to acquire highly detailed, accurate, dense, and robust information describing the environment. For instance, turning briefly to FIGS. 7A, 7B, 8, and 9, these figures illustrate how these robust camera systems can operate.

Figure 7A:
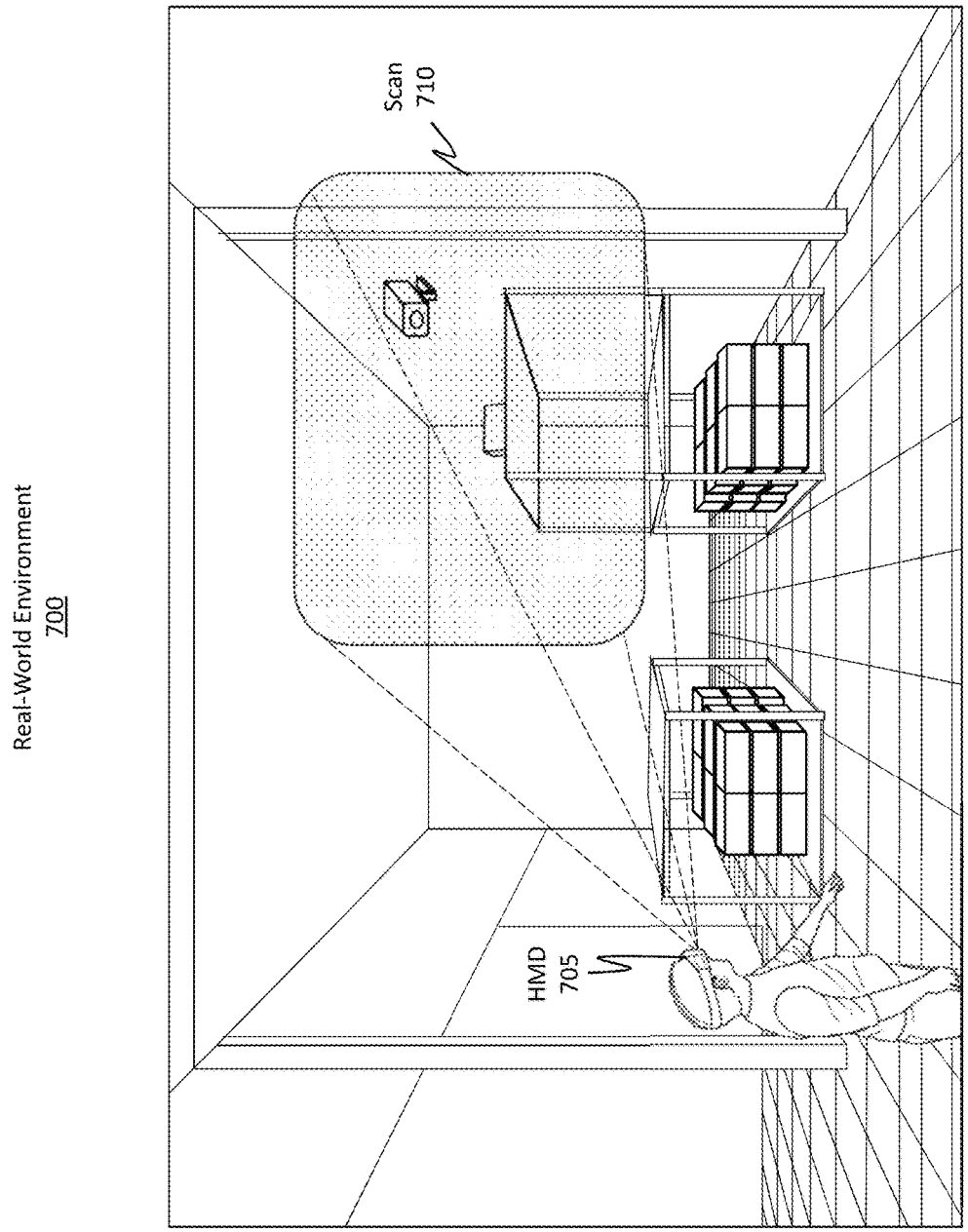
FIGS. 7A and 7B illustrate how an HMD's cameras can be used to scan a real-world environment to generate a spatial mapping of the environment.
Figure 7B:
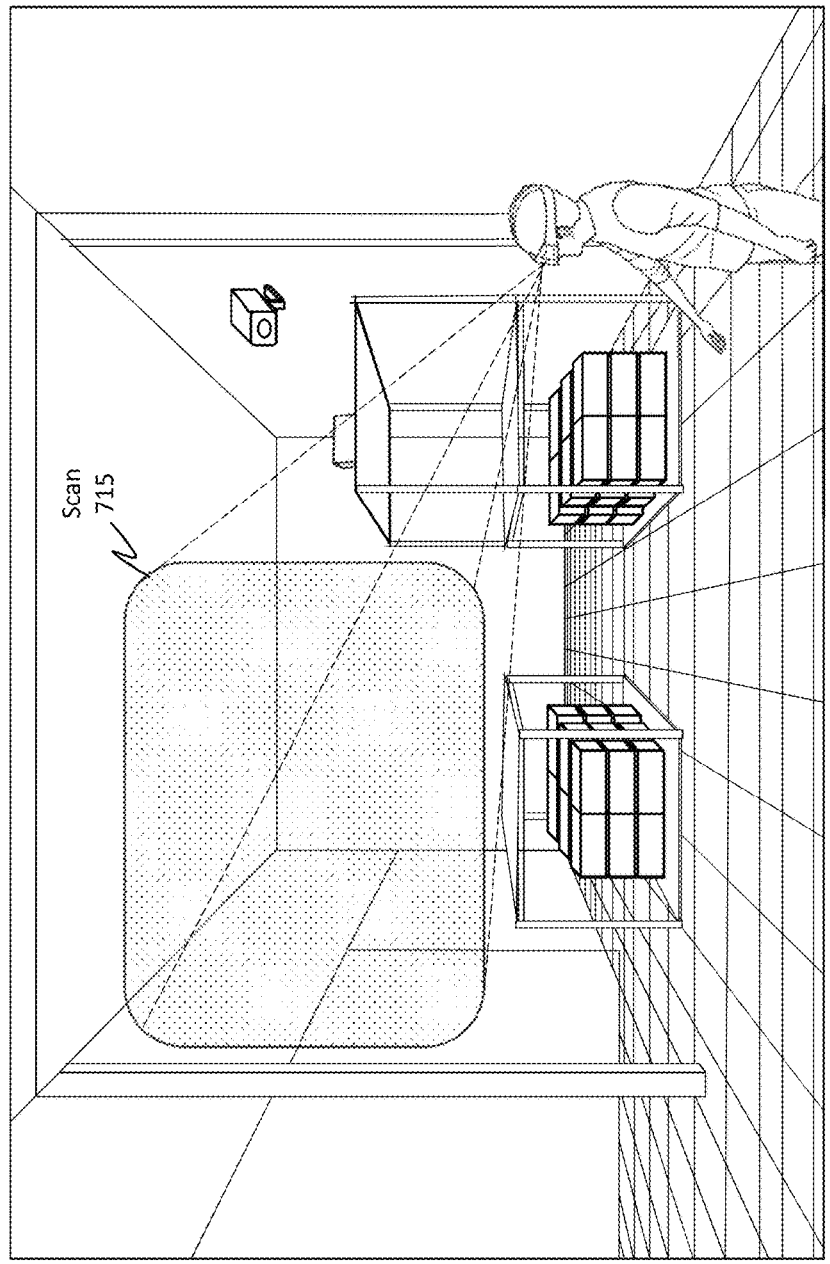

FIG. 7A shows a real-world environment 700 and HMD 705, both of which are representative of the corresponding entities discussed earlier. Here, HMD 705 is using its robust cameras to scan 710 the real-world environment 700 by taking pictures and/or by determining depth measurements of the objects within the real-world environment 700. As the user moves around, as shown in FIG. 7B, additional scans (e.g., scan 715) can be acquired to obtain additional information describing the real-world environment 700.

Figure 8:
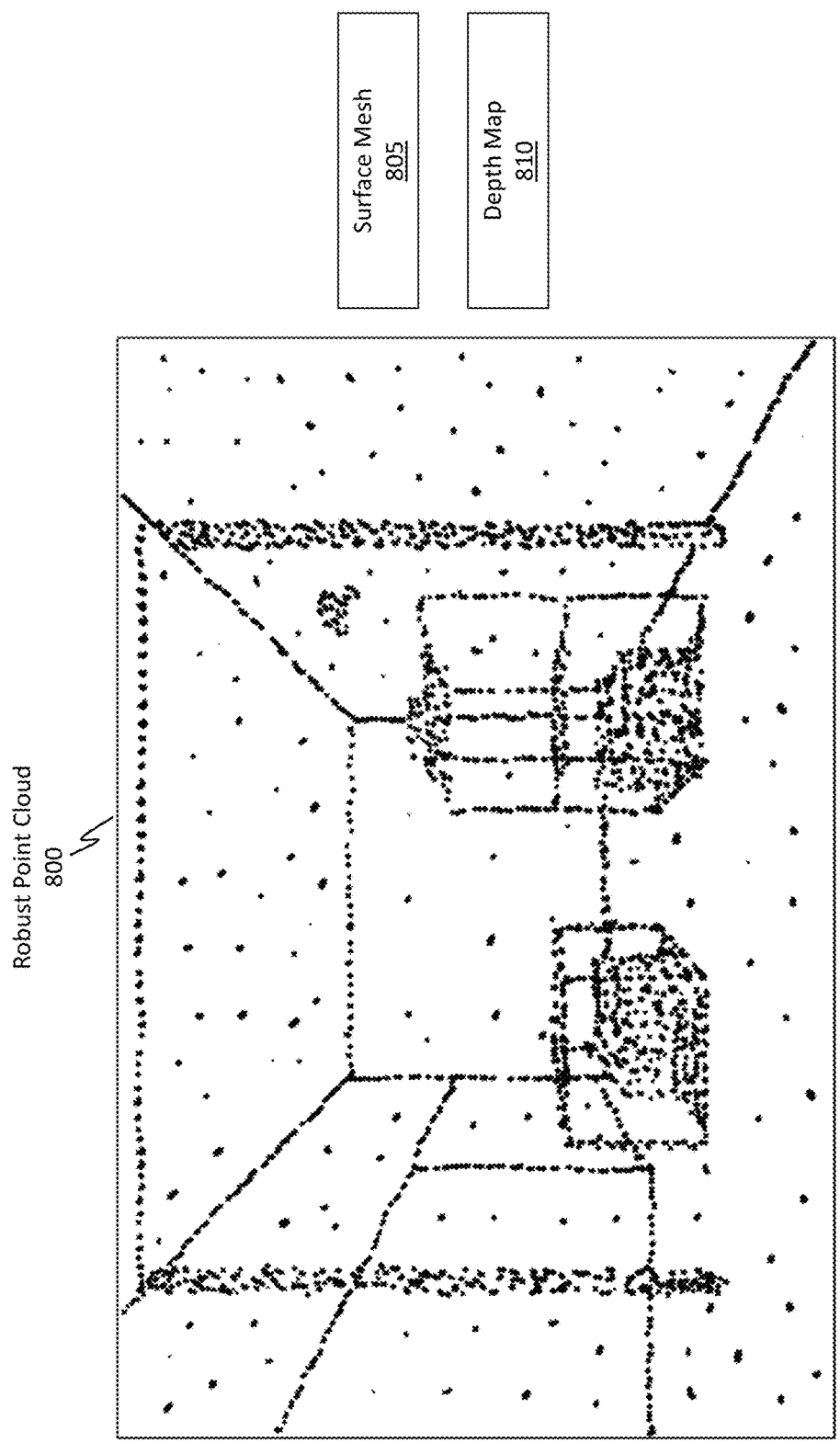
FIG. 8 illustrates an embodiment of a robust point cloud, which can be used to generate a robust surface mesh (i.e. a spatial mapping). This robust point cloud accurately and descriptively identifies objects.

In some cases, the scanned information will result in the generation of a robust point cloud 800, as shown in FIG. 8. Point cloud information in the robust point cloud 800 may have been generated by the HMD itself, from other HMDs in the same environment, from other sensors in the environment, or even from third-party sensor data that was previously acquired and retained. Here, the point data in the robust point cloud 800 describes the objects that were in the real-world environment 700 (e.g., the support beams, shelves, cameras, walls, etc.).

Using this robust point cloud 800, some embodiments create a surface mesh 805 and/or a depth map 810. As used herein, a "3D surface mesh," "surface mesh," or simply "mesh" is a geometric representation or model made up of any number of discrete interconnected faces (e.g., triangles) and/or other interconnected vertices. The combination of these vertices describes the environment's geometric contours, including the contours of any objects within that environment. By generating such a mesh, the embodiments are able to map out the contents of an environment and accurately identify the objects within the environment. Relatedly, depth map 810 can include depth values arranged in a map format. As used herein, a "spatial mapping" can include point clouds, surface meshes, and depth maps. It will be appreciated that FIGS. 8, 9, 10, and 11 are for example purposes only and should not be considered binding. Indeed, actual 3D point clouds and spatial mappings will include significantly more 3D points and 3D information than the visualizations provided in these figures.

Figure 9:
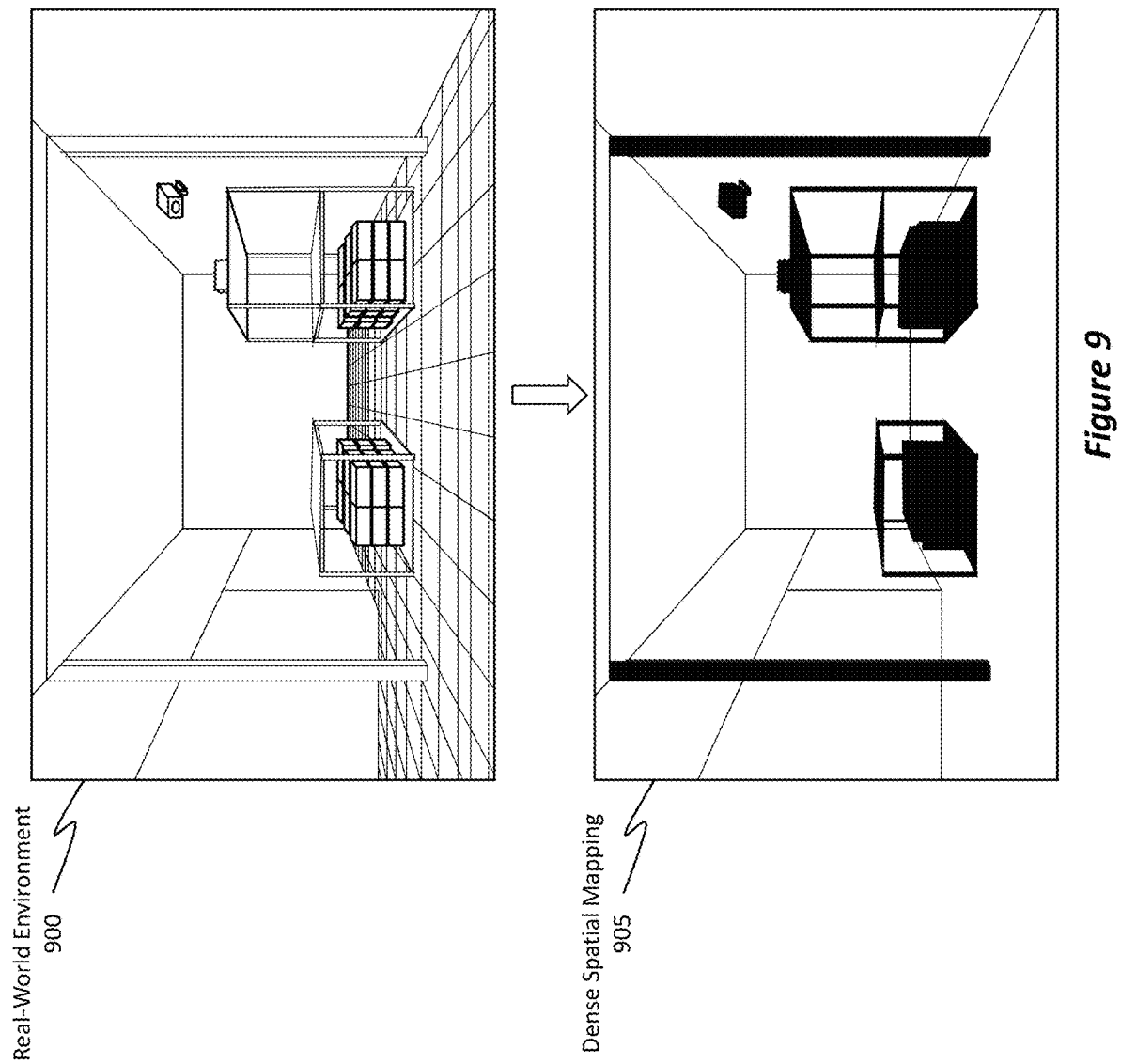
FIG. 9 illustrates how, using a robust point cloud, a dense spatial mapping can be created, where the dense spatial mapping includes highly detailed surface/textural information.

FIG. 9 shows how the real-world environment 900 can be scanned in order to generate a dense spatial mapping 905. As described earlier, a "spatial mapping" (also called a 3D reconstruction) refers to a 3D representation of an environment. Furthermore, the objects within an environment can be segmented (i.e. "identified") using any type of object recognition or machine learning algorithm such that the spatial mapping is also able to identify and characterize objects.

As shown by the dense spatial mapping 905, many individual objects in the real-world environment 900 can be identified (e.g., the support beams, walls, shelves, and even camera are all clearly identifiable in the dense spatial mapping 905). In this regard, these types of camera systems include the ability to generate a highly robust and detailed spatial mapping of an environment.

Returning to FIG. 6, the camera system 605 is also shown as including a passive stereo camera system 620 and a motion stereo camera system 625. These types of camera systems typically do not actively illuminate an environment when scanning. By way of background, motion stereo camera system 625 follows a similar principle as a stereo camera system, but instead of having two cameras, only one camera is used. This one camera is moved in order to collect the scanning data. Provided that the environment remains static, the resulting images generated by the motion stereo camera system 625 can also be used to compute depth and a spatial mapping. In any event, the resulting spatial mappings from these types of camera systems are typically of a much lower resolution than the spatial mappings generated from the active camera systems described earlier.

Figure 10:
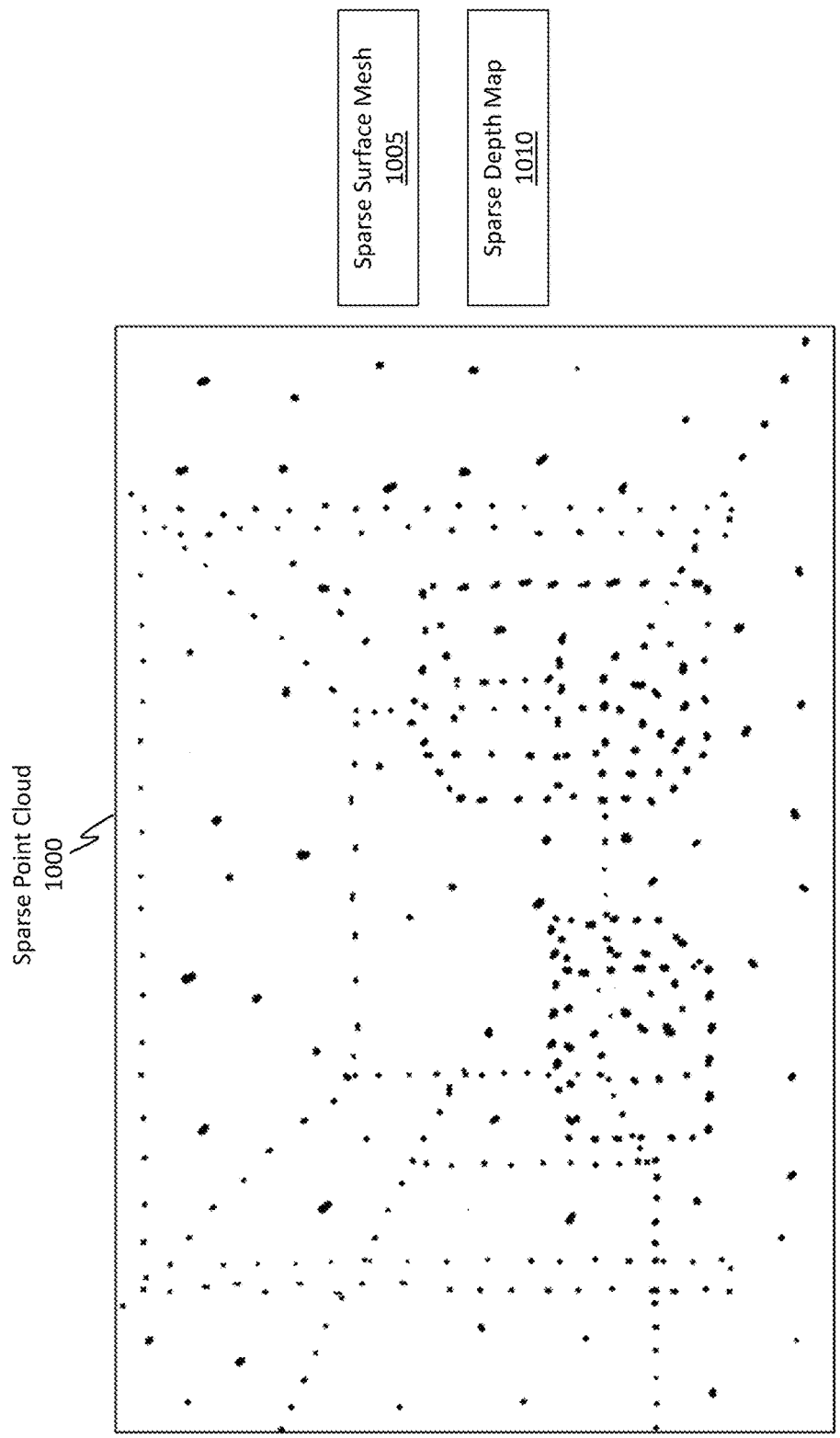
FIG. 10 illustrates an embodiment of a sparse point cloud, which includes considerably less information than a corresponding robust point cloud.

To illustrate, FIG. 10 shows a sparse point cloud 1000, which is typically generated by the passive stereo camera system 620 and/or the motion stereo camera system 625 of FIG. 6. This sparse point cloud 1000 can be used to generate a sparse surface mesh 1005 or a sparse depth map 1010 (collectively referred to as a sparse spatial mapping). Accordingly, head tracking data can be used to obtain 3D depth information to thereby generate a single, low-cost sensor set.

Figure 11:
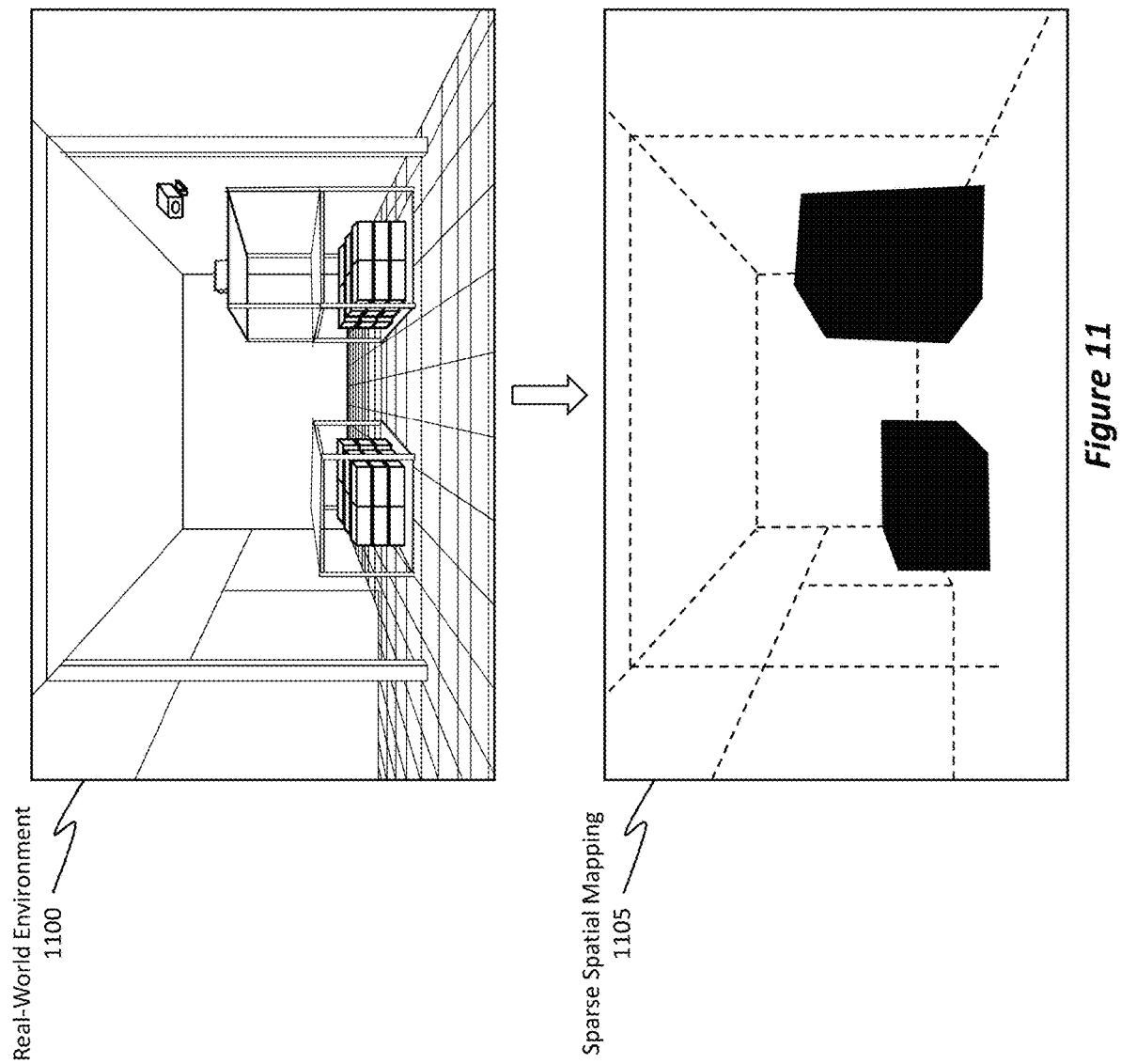
FIG. 11 illustrates how, using a sparse point cloud, only a sparse spatial mapping can be created, where the sparse spatial mapping includes significantly less detailed surface and textural information for the objects as compared to a corresponding dense spatial mapping.

FIG. 11 then shows the resulting spatial mapping. Specifically, FIG. 11 shows a real-world environment 1100 and the resulting sparse spatial mapping 1105. It will be appreciated that the sparse spatial mapping 1105 may be generated using a passive stereo camera system, a motion stereo camera system, even an active stereo camera system (e.g., an active structured light camera) or an active time-of-flight camera (e.g., when they are configured to operate at reduced resolution, scanning duration, or power mode, as described later). Accordingly, these camera systems may be included as a part of a head or hand tracking system of an HMD.

When compared to the dense spatial mapping 905 of FIG. 9, the sparse spatial mapping 1105 of FIG. 11 includes significantly less detail. For instance, in the sparse spatial mapping 1105, the walls may not be as clearly defined, the support beams may not be as clearly defined, the camera is no longer represented, and even the shelves are less descriptively represented. In FIG. 9, each shelf in the shelving units was represented, along with the boxes on those shelves. In FIG. 11, however, the shelves and boxes are represented as a single collective unit, without particular distinction (because of the lower resolution scanning data).

In a most extreme embodiment, which does not apply to all embodiments, the terms "dense," "robust," and "sparse" are simply terms of relativity. Dense and robust are terms that mean the resulting dense spatial mapping is relatively more complete or detailed than a sparse spatial mapping. It will be appreciated that in some cases, a dense spatial mapping may also not completely or fully describe the surface and texture of an object, but it will describe the object more completely than a sparse spatial mapping.

In this regard, the sparse spatial mapping 1105 is relatively less accurate and includes relatively less detail than the dense spatial mapping 905. In some cases, the sparse spatial mapping 1105 may include 90%, 80%, 70%, 60%, 50%, 40%, 30%, or even 20% of the detail of the dense spatial mapping 905. Accordingly, the sparse spatial mapping 1105 includes incomplete surface and/or texture data of objects within the environment. Although sparse, the corners and edges of the objects in the environment are generally still detectable and can still be represented within the sparse spatial mapping 1105 (i.e. perimeter edge data describes the edge perimeters of the objects).

Stated differently, perimeter edge data describes a portion, but not all, of one or more perimeter edge(s) of objects such that the perimeter edge data constitutes some, but incomplete, data. It follows then that the resulting sparse spatial mapping (which uses the perimeter edge data) is also sparse as a result of relying on the incomplete data.

Furthermore, the sparse spatial mapping 1105 is able to identify at least the edge perimeters of the objects within the environment. To clarify, although the cameras may not be able to detect specific surfaces or textures of the objects, the cameras are at least able to detect the edge perimeters of those objects. With reference to FIG. 11, the cameras can detect the edges of the shelving units, though (as represented by the sparse spatial mapping 1105), the cameras were not able to adequately distinguish between the boxes on the shelving units nor were the cameras able to distinguish between the different shelving levels. Notwithstanding this limitation, identifying the edges, perimeters, or edge perimeters is sufficient to identify the outer bounds or boundaries of those objects. With regard to obstacle avoidance, this limited edge perimeter data is also now sufficient to enable the HMD to help the user avoid colliding with those objects.

While the above disclosure focused on a scenario in which a passive stereo camera system and/or a motion stereo camera system was used to generate the sparse spatial mapping 1105, it will be appreciated that an active stereo camera system and/or a time of flight camera can also be used to generate the sparse spatial mapping 1105. For instance, those systems can be configured to operate in a reduced power mode such that less surface and texture data is collected. For instance, the systems can operate at 90%, 80%, 70%, 60%, 50%, 40%, 30%, or even 20% of their normal or default operating power levels when scanning an environment.

Additionally, or alternatively, those systems can be configured to operate in a reduced scan-time mode in which the systems spend less time scanning the room. For instance, the systems can scan at 90%, 80%, 70%, 60%, 50%, 40%, 30%, or even 20% of their normal or default scanning time, duration, or rate to thereby produce a lower resolution spatial mapping. In doing so, these camera systems can be configured to operate at a lower power mode and/or at a reduced compute processing mode, to thereby prolong battery life as needed. In some cases, the systems can be configured to switch to these lower power modes in response to certain events or triggers. For instance, switching modes can occur when the battery level reaches a particular threshold level. In some cases, switching modes can occur in response to certain environmental factors, such as the amount of ambient light in the room. For example, if the amount of ambient light is at a particular level, then active illumination can be turned off and the room can be scanned only in a passive, non-illuminating manner.

Accordingly, some high-end HMD systems can be configured to generate a sparse spatial mapping. Additionally, some low-end HMD systems might be constrained (e.g., hardware constraints) to be able to provide only a sparse spatial mapping. Regardless of the type of hardware used to generate the sparse spatial mapping, the disclosed embodiments are able to beneficially use this sparse spatial mapping to perform obstacle avoidance. It will be appreciated that this sparse spatial mapping can be generated in real-time while the HMD is operating within an environment, or the spatial mapping may have been generated at an earlier time, stored in a repository (e.g., the cloud), and then made available for access. In some cases, a single HMD unit generated the sparse spatial mapping while in other cases multiple HMD units contributed to generating the sparse spatial mapping (e.g., data from multiple HMDs is aggregated/fused together). The data can be acquired all within a single scanning event, or it can be aggregated over time and over multiple different scanning events. In this regard, the disclosed embodiments are highly dynamic and flexible and may be implemented across many different scenarios and circumstances. As such, the disclosed principles should be interpreted broadly.

Using a Sparse Spatial Mapping to Perform Obstacle Avoidance

In accordance with the disclosed principles, the embodiments are able to identify a 3D obstacle avoidance problem (i.e. objects within a room are three-dimensional and thus represent a 3D problem when trying to avoid those objects) and reduce that problem down to a 2D problem and solution. Performing computations on 2D data requires less processing and time than performing computations on 3D data (e.g., because less data is computed and operated on).

After accessing the sparse spatial mapping of the environment, the disclosed embodiments are able to interpret the depth data and generate a two-dimensional mapping of the environment. By "interpret," it is meant that the disclosed embodiments are able to translate the 3D information into 2D information. For instance, a 2D ground plane or visualization of the environment can be created based off of the 3D information in the sparse spatial mapping. In essence, the environment can now be represented from a bird's eye view, where the environment, including all of the objects within the environment, is represented two-dimensionally from a top aerial perspective (i.e. a bird's eye view or a plan view). That is, if the environment were viewed from above, relative to the environment's gravity vector, then the height dimensions of the 3D objects are essentially eliminated, leaving only length and width dimensions. Such a change in perspective results in 3D objects being transformed or translated to now appear as pixels within a 2D ground plane image.

With this 2D ground plane image, every 2D pixel in the 2D image can be classified as being either empty or free. Furthermore, "voxels" (i.e. rectangular cuboids, volumetric pixels, or 3D grids) associated with the floor plane can also be classified as either being empty/free space or as being occupied space (i.e. occupied by an object in the environment) as a result of performing the much simpler 2D pixel determination. Therefore, the disclosed embodiments use the sparse spatial mapping to generate a different representation of the environment. In this regard, instead of making a decision for every rectangular cuboid, 3D grid, or "voxel" in the environment, the disclosed embodiments need only label a pixel (i.e. a 2D image artifact) in a binary manner, either occupied or not occupied. Furthermore, instead of seeking to identify specific contours and features of an object, the disclosed embodiments determine only 2D edge data. Accordingly, the embodiments operate using 2D pixels and intelligently determine whether any particular pixel is occupied (i.e. an object is present at the location corresponding to the pixel) or is not occupied.

In some cases, instead of storing only a binary value, some embodiments additionally store an array of integers. Some of these integers represent the height of the object and may be used to determine the height of a bounding fence that may later be used.

As indicated above, the top aerial perspective (i.e. the bird's eye view) is projected or determined along the gravity vector that was computed using the HMD's IMU data. Accordingly, the disclosed embodiments are able to translate 3D data into 2D data by removing the height dimension along the gravity vector and by viewing the environment from a bird's eye view.

Figure 12:
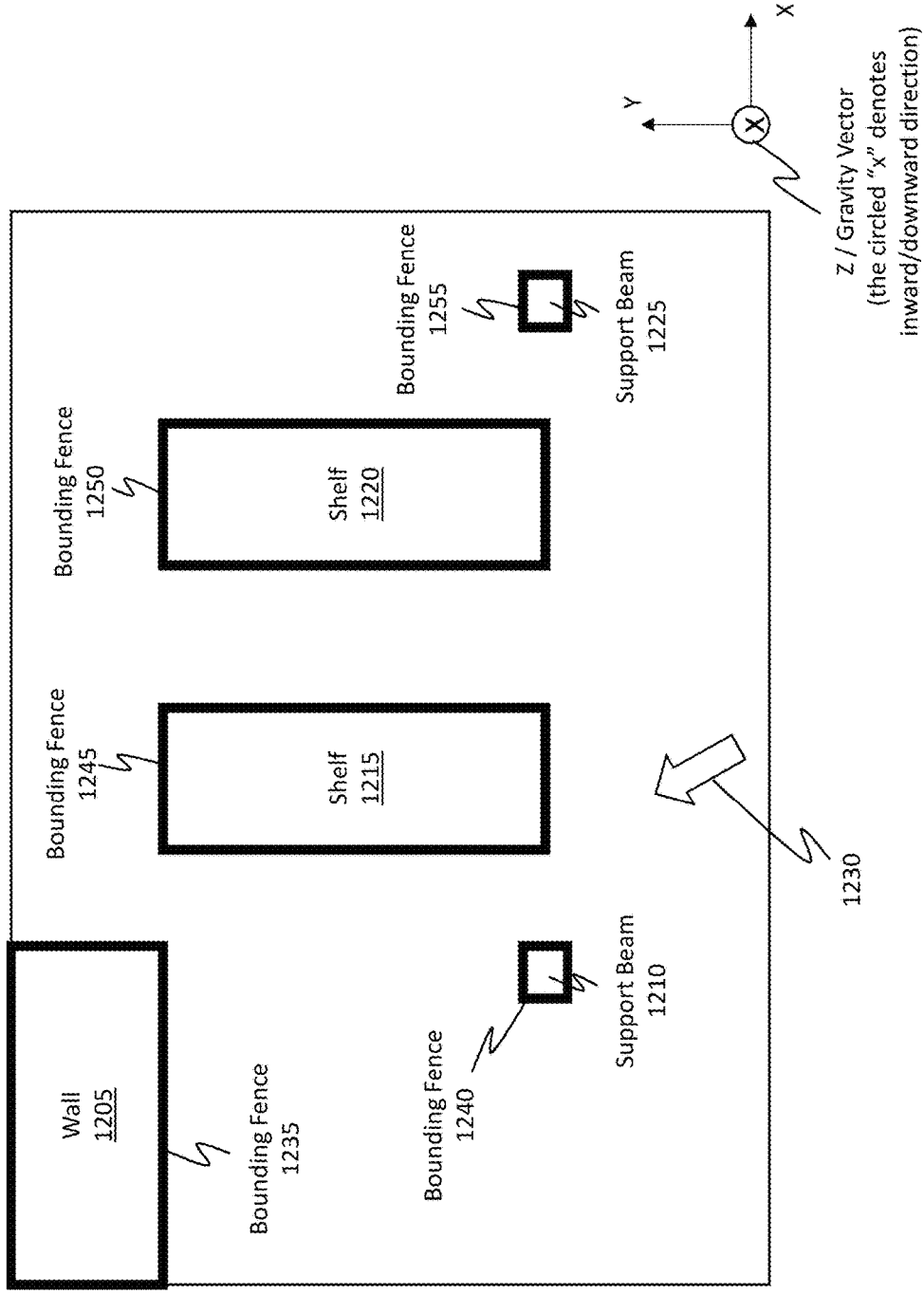
FIG. 12 illustrates a bird's eye perspective of the environment of FIG. 5, where this perspective is generated by creating a 2D representation of the 3D environment. This perspective also shows bounding fences around the different objects in the environment.

FIG. 12 shows a bird's eye perspective 1200 of the real-world environment 300 of FIG. 3. Head tracking, which is performed by the HMD, also provides the orientation and positioning of the user within the real-world 3D space or environment.

The bird's eye perspective 1200 was generated using the sparse spatial mapping 1105 of FIG. 11. This bird's eye perspective 1200 visually illustrates wall 1205 (which is representative of wall 315 from FIG. 3), support beam 1210 (which is representative of support beam 310), shelf 1215 (which is representative of shelf 320), shelf 1220 (which is representative of shelf 325), and support beam 1225 (which is representative of support beam 335). An x-y-z legend is also illustrated to provide bearing on the different perspectives. For instance, the circled x represents a downward z dimension (also the "gravity vector"), which is representative of the gravity vector 340 from FIG. 3.

In this regard, the height dimensions of the 3D objects have been eliminated, discarded, or filtered from consideration by the disclosed embodiments, thereby translating an incomplete or partial 3D representation of the objects (i.e. the sparse spatial mapping) in an easier-to-work-with 2D representation of those objects. To further elaborate, while the sparse spatial mapping 1105 of FIG. 11 was inadequate to clearly distinguish between the boxes and levels on the shelves, it is now unnecessary to perform this distinction because the shelves are viewed from a top aerial perspective. The sparse spatial mapping 1105 was adequate to identify at least the 2D edge perimeters (as determined from a top/plan view) of the shelves and the other objects within the room. As such, the edge perimeter data is sufficient to represent the objects from a 2D perspective.

The bird's eye perspective 1200 is also able to visually render a representation of the user via indicator 1230. In this case, indicator 1230 is rendered as an arrow, though other visualizations of the user's relative position and/or orientation within the mapped environment may be used (e.g., a 2D avatar, a triangle, a picture, etc.). The indicator 1230 can be an animated illustration (e.g., when the user moves, the indicator not only moves to track the user's movements through the 2D environment but can also illustrate a walking animation) or it can be a static illustration (and just track the user's movements through the 2D environment).

In some cases, the indicator 1230 can also visually portray the direction in which the user is currently facing (i.e. the user's orientation or pose). For instance, indicator 1230 is shown as an arrow, with the direction of the arrow indicating the direction in which the user is currently facing. This directional visualization can be computed using the HMD's IMUs, head tracking cameras, and/or other direction or compass determining units.

The disclosed principles relate to a new technique for obstacle avoidance. This technique may be implemented without adding additional cost or sensors to the HMD. This technique may also use what is referred to as a "bounding fence," "compute fence," or simply "fence," which provides a low-cost, computationally inexpensive visualization for defining the play-space or movement space (i.e. areas where the user can move without colliding with an object) for MR scenes.

FIG. 12 illustrates the different bounding fences via the dark bolded areas around the objects. Specifically, FIG. 12 shows bounding fence 1235 around wall 1205, bounding fence 1240 around support beam 1210, bounding fence 1245 around shelf 1215, bounding fence 1250 around shelf 1220, and bounding fence 1255 around support beam 1225. In some cases, the bounding fences are shaped to correspond to the outer bounds or shapes of the objects they surround. In some cases, especially when multiple corners of the object are grouped or positioned very near one another, the bounding fence visually merges multiple corners to form a single corner. In the bird's eye perspective 1200, the bounding fences are visually illustrated to emphasize the metes and bounds of objects within the environment. The bounding fences are also provided to alert the user when the user is near an object.

For instance, as the user travels about the real-world environment, the indicator 1230 will mimic or track the user's movements within the rendered 2D environment. By looking at the bird's eye perspective 1200, the user can determine whether he/she is nearing an object because the object will be highly emphasized via use of the bounding fences. In some cases, additional alerts may be provided, such as an audio alert or even additional visual cues (e.g., text in the HMD, a red splash image or hologram in the HMD, etc.). In some instances, a visualization of the 2D bird's eye perspective 1200 is visually displayed to a user through their HMD, only in response to user input requesting the display. In other embodiments, the visualization of the 2D bird's eye perspective 1200 is constantly displayed while the HMD is in certain states/contexts and is displayed within a dedicated portion of the viewing area of the HMD. In yet other embodiments, the visualization of the 2D bird's eye perspective 1200 is only intermittently and dynamically rendered in response to the user reaching and/or being within a threshold distance from a mapped object in the 2D bird's eye perspective 1200 and/or within a threshold distance from a mapped object having particular declared attributes that are declared to the HMD—such as by a broadcast from the object or associated beacon or a download of third party content).

Figure 13:
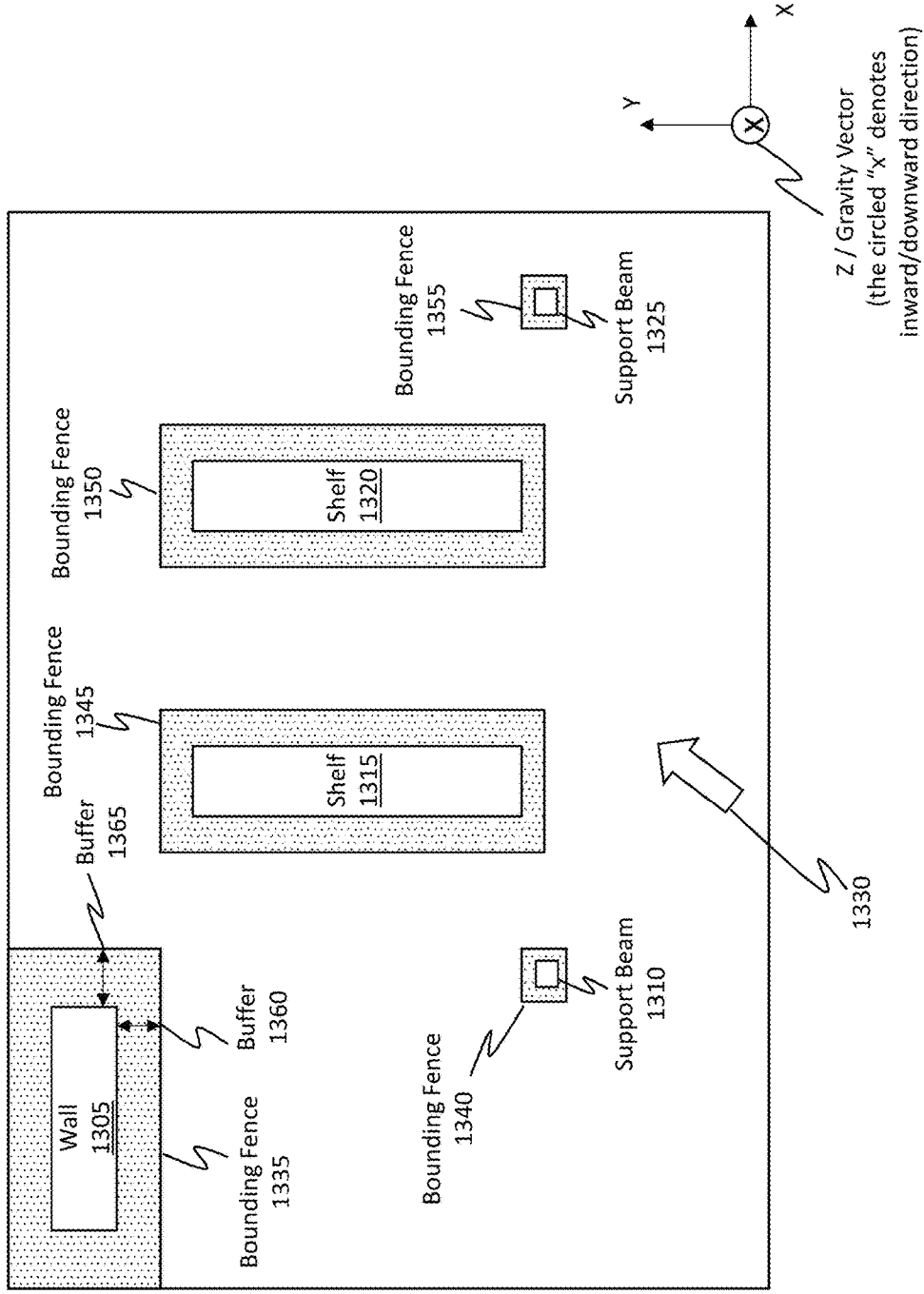
FIG. 13 illustrates how a buffer can be provided around an object such that an area occupied by the bounding fence is larger than an area occupied by the object.

In some cases, a buffer region may be provided between the object and the bounding fence. For instance, FIG. 13 illustrates another bird's eye perspective 1300, which is also representative of the real-world environment 300 of FIG. 3. FIG. 13 shows the wall 1305, support beam 1310, shelf 1315, shelf 1320, support beam 1325, an indicator 1330 representative of the user's position within the environment, and an x-y-z legend.

FIG. 13 also shows the bounding fences 1335, 1340, 1345, 1350, and 1355 around their respective objects. In contrast to the bird's eye perspective 1200 of FIG. 12, bird's eye perspective 1300 now includes a buffer region around each object. This buffer region is provided to cushion or buffer the fence from its corresponding object. Providing such a buffer may also help the user in navigating the environment and may help the user from immediately striking or colliding with an object in the event the user minorly or minimally breaches the bounding fence.

To illustrate, FIG. 13 shows buffer 1360 and buffer 1365 around wall 1305. Buffers 1360 and 1365 expand the area defined by wall 1305 and operate as a buffer between bounding fence 1335 and wall 1305. That is, instead of using the exact edges of wall 1305, the buffers 1360 and 1365 operate to virtually enlarge the wall 1305, thus providing a safety region where, if the user does somewhat breach the bounding fence, the user will not immediately strike the object. In this regard, the area defined by an actual object may be smaller than the area defined by that object's corresponding bounding fence. It will be appreciated that the buffers 1360 and 1365 may be set to any value (e.g., 1 inch larger than the bounds of the object, 2 inches, 3 inches, 4 inches, 5 inches, 6 inches, 1 foot, 2 feet, 3 feet, and so on). In some cases, larger objects may have a relatively larger buffer than smaller objects, or vice versa, in which a smaller object may have a relatively larger buffer region than a larger object. The object's determined type, dimension, or configuration may determine or may influence the size of that object's bounding fence, including its buffer regions.

Accordingly, the disclosed embodiments are able to generate any number of bounding fences, which are defined by the 2D boundaries of their corresponding objects to form 2D planar areas surrounding those objects, where the planar areas are oriented relative to the gravity vector. In some cases, a buffer is provided between a bounding fence and the 2D boundaries of the object. Consequently, an area defined by the bounding fence may be larger than an area defined by the 2D boundaries of the object. It will be appreciated that one or more objects may have buffers while one or more other objects may not have buffers. Determining which objects will have buffers can be dependent on the object's object type (which may be detected through object identification and reference tables or which may be declared), on the size of the object, on the MR scene experience (e.g., will the user be moving around a lot), or even on the user's detected behavior (e.g., is the user prone or likely to bump into something). The size of the buffer can also be dynamically determined and may be different for different objects, even within the same MR scene. In some cases, the buffer can be visually modified or formatted to round out corners/edges or even to aggregate closely proximate edges to thereby form a single curved edge as opposed to multiple discrete edges.

Visualizing Bounding Fences

Figure 14:
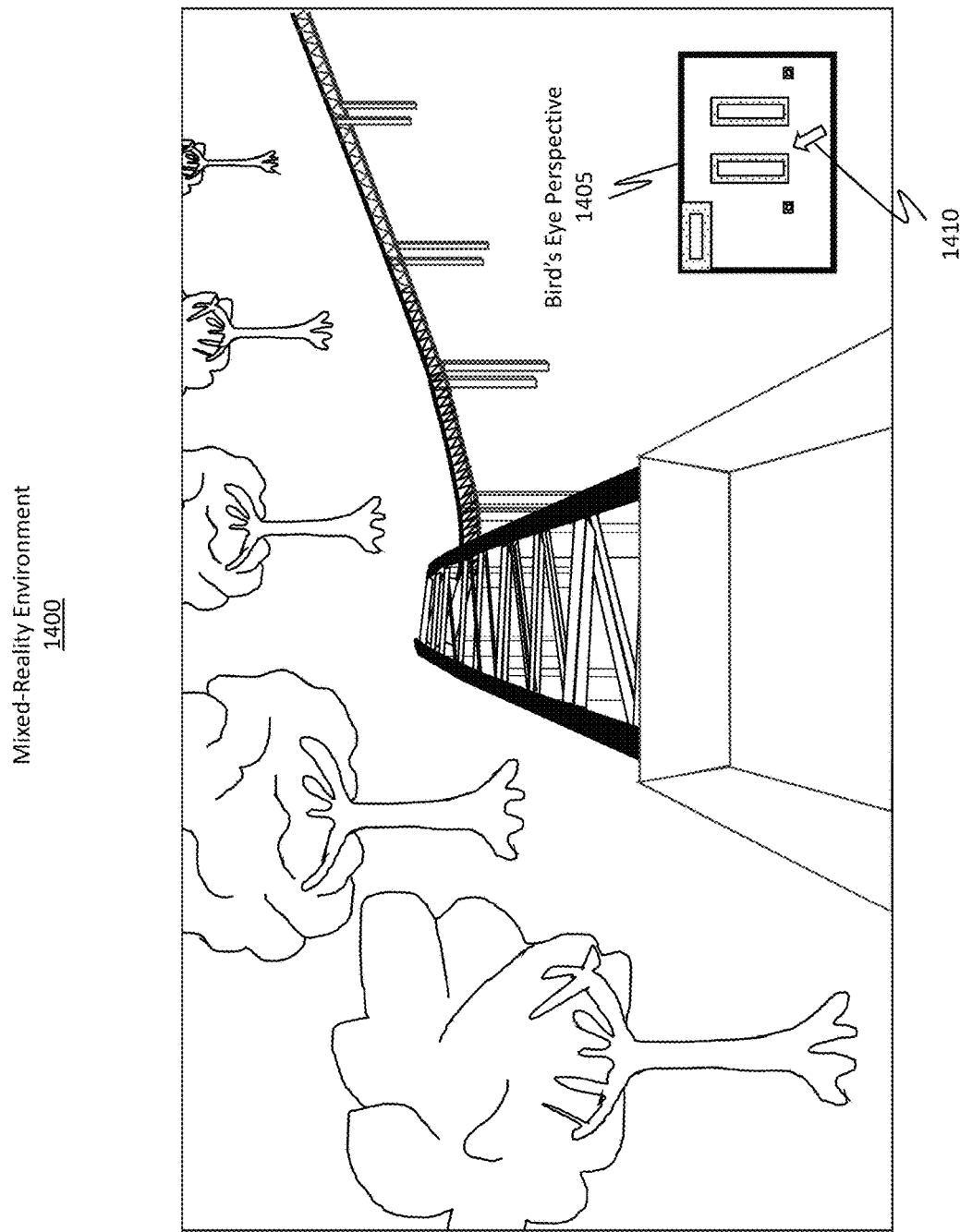
FIG. 14 illustrates how the bird's eye perspective/view can be rendered within a mixed-reality scene.

FIG. 14 illustrates a mixed-reality environment 1400, which is representative of the mixed-reality environment 400 of FIG. 4. Here, a bird's eye perspective 1405 is also visually rendered within the mixed-reality environment 1400, where the bird's eye perspective 1405 is representative of any of the earlier bird's eye perspectives/views discussed thus far and where the bird's eye perspective 1405 is projected parallel to/along with the gravity vector. Bird's eye perspective 1405 also specifically includes an indicator 1410 illustrating the user's actual position within the real-world environment. In this regard, even though the user may not be able to directly see the real-world environment (e.g., in a VR case), the user can still be made aware of his/her surroundings by consulting the bird's eye perspective 1405.

In some cases, the bird's eye perspective 1405 is always visually rendered within the mixed-reality environment 1400. In other cases, the bird's eye perspective 1405 is only selectively rendered in response to certain conditions, circumstances, events, or triggers. In this regard, rendering the bird's eye perspective 1405 (i.e. a type of "virtual object") may be performed only in response to a triggering event. For instance, the bird's eye perspective 1405 may, as a default, not be displayed. In some cases, when the HMD determines that the user (or HMD) is located within a predetermined or pre-established threshold distance to an object, then the HMD may trigger the display of the bird's eye perspective 1405. As such, proximity detection or a likelihood of collision may cause the bird's eye perspective 1405 to be rendered. The bird's eye perspective 1405 can be placed anywhere within the mixed-reality environment 1400 and is not limited to only the bottom right-hand corner. Indeed, the bird's eye perspective 1405 can also be placed so as to overlap one or more other holograms/virtual images.

Additionally, the size of the bird's eye perspective 1405 can vary or be dynamically adjusted. In some cases, the size can be modified based on the user's proximity to an object, where the size progressively gets larger as the user progressively moves nearer to an object and where the size progressively gets smaller as the user progressively moves away from the object. The embodiments can terminate the display of the bird's eye perspective 1405 in response to determining that the user/HMD is no longer within the distance threshold. In some cases, a maximum size and a minimum size of the bird's eye perspective 1405 may be imposed, where the bird's eye perspective 1405 is not permitted to become larger than the maximum size or smaller than the minimum size. Some embodiments, on the other hand, refrain from having size restrictions.

Figure 15:
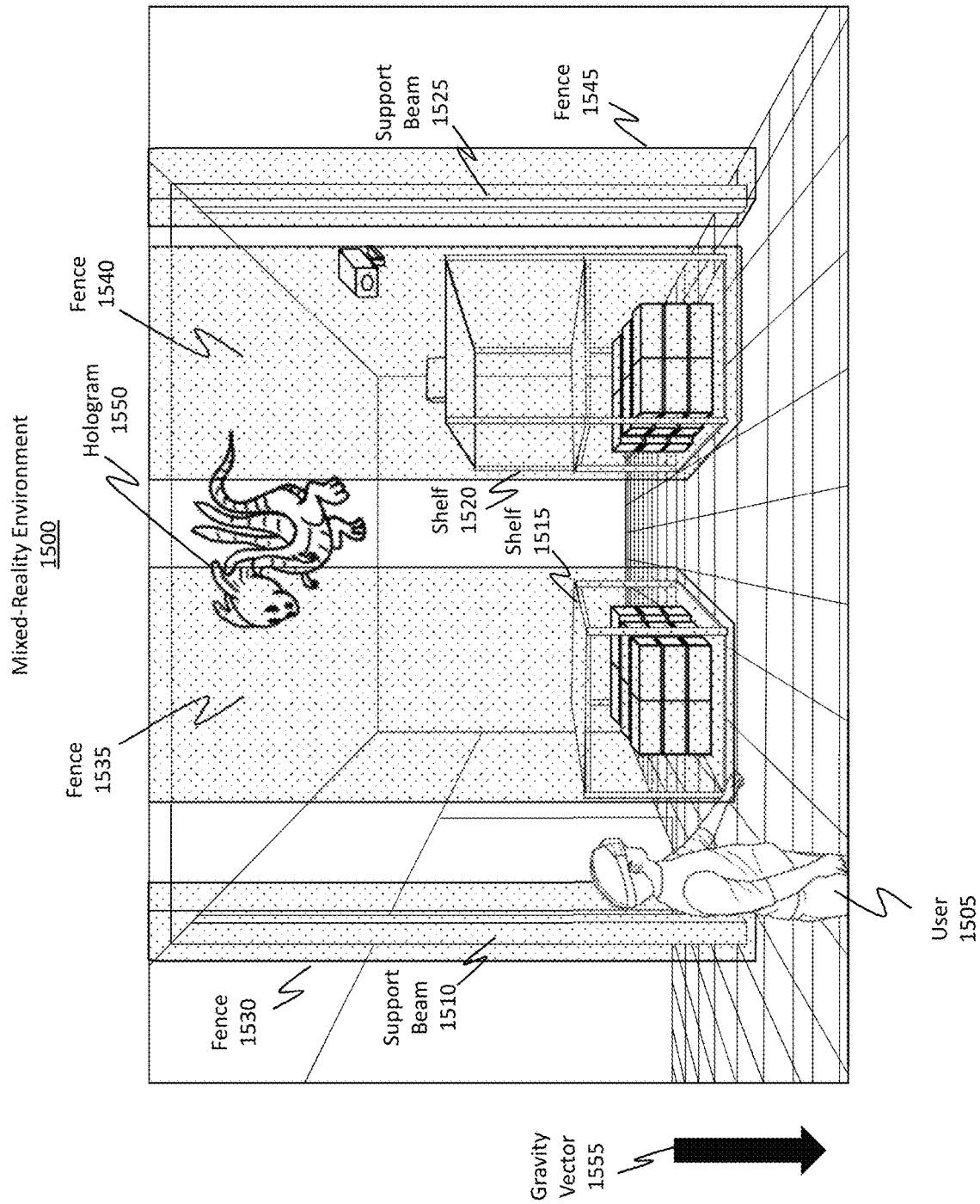
FIG. 15 illustrates how the bounding fences can also be rendered in a 3D manner.

FIG. 14 illustrated a scenario in which a 2D bounding fence was visualized. In addition to performing the 3D-to-2D translation described earlier, some embodiments are also able to render a visualization of the bounding fence as a separate hologram, as shown in FIG. 15. Similar to how the bird's eye perspective was selectively displayed or terminated from display in response to one or more triggers, the bounding fences may also be selectively displayed or terminated from display in response to the same triggers discussed earlier.

Specifically, FIG. 15 illustrates a mixed-reality environment 1500, which is similar to the real-world environment 300 of FIG. 3 but which now includes holograms, and a user 1505 in that environment. Mixed-reality environment 1500 includes the following real-world objects: support beam 1510, shelf 1515, shelf 1520, and support beam 1525. In addition to these real-world objects, mixed-reality environment 1500 also includes a number of holograms. These holograms include fence 1530, fence 1535, fence 1540, fence 1545, and hologram 1550 (i.e. a dragon). FIG. 15 also shows the gravity vector 1555.

In accordance with the disclosed principles, the embodiments are able to generate and display a bounding fence around the objects in the mixed-reality environment 1500 to alert the user of the objects. Similar to the earlier discussion, these bounding fence holograms can be displayed continuously or can be displayed in response to certain stimuli or triggering conditions.

Figure 16:
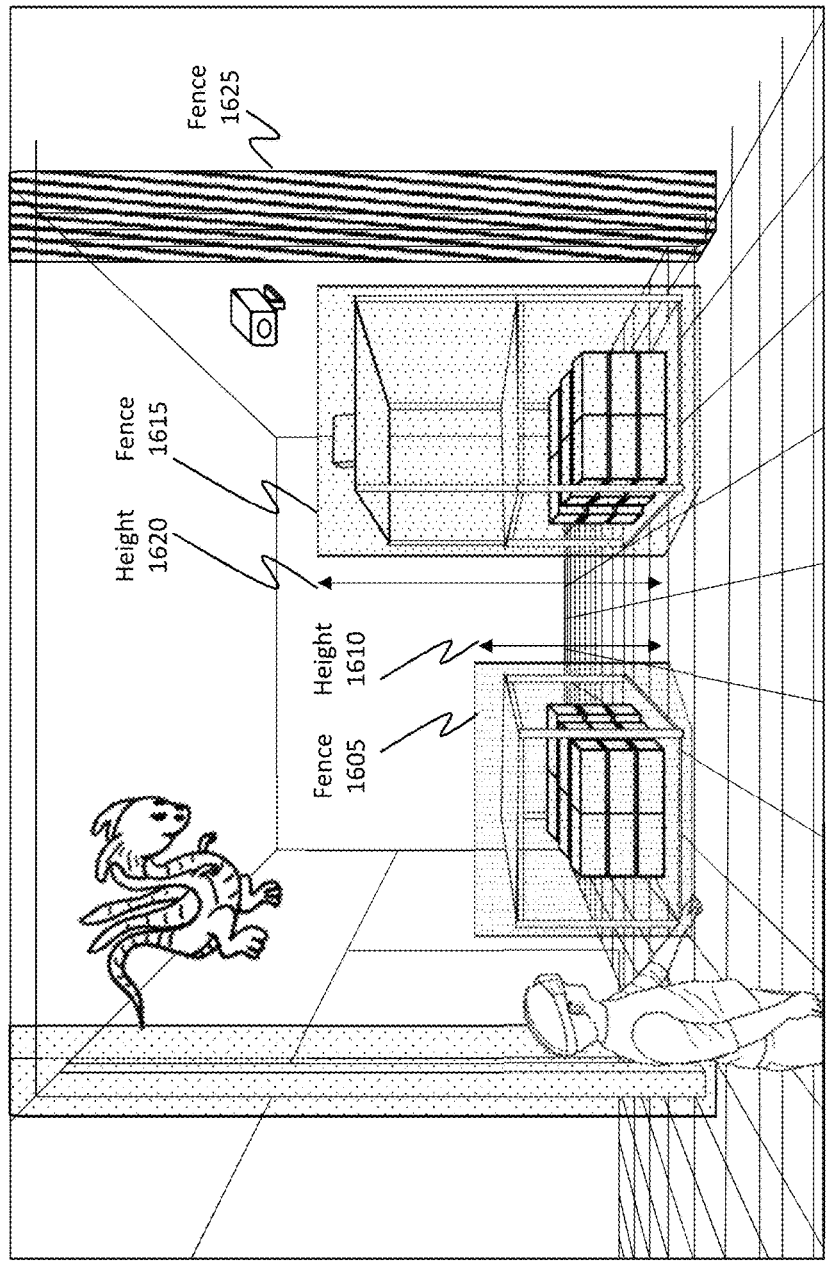
FIG. 16 illustrates how the height of the bounding fences can be adjustable.

As depicted in FIG. 15, in some cases, a bounding fence includes a rectangular cuboid or a 3D voxel whose length and width are defined by the 2D boundaries of the object. Furthermore, the height of this rectangular cuboid/3D voxel can extend upwardly. In some cases, the height extends upwardly in an infinite or unbounded direction perpendicular to the 2D planar area defined by the 2D boundaries of the object and parallel to the gravity vector. In other situations, however, the height extends vertically in a bounded direction perpendicular to the 2D planar area and parallel to the gravity vector. For instance, the height may extend at least to a height of the object so that the rectangular cuboid/3D voxel entirely envelopes the object. Such a scenario is illustrated in FIG. 16. Of course, the fence's height can extend even further than the object's height, such as in cases where a vertical buffer is used. In such situations, the volume occupied by the object is smaller than the volume occupied by the fence.

FIG. 16 shows a mixed-reality environment 1600, which is representative of the mixed-reality environment 1500 of FIG. 15. Also shown are a fence 1605, with its corresponding height 1610, fence 1615, with its corresponding height 1620, and fence 1625. In contrast to the fences in FIG. 15, fences 1605 and 1615 have bounded heights. Here, height 1610 extends at least to the height of its corresponding shelf object and, in some circumstances, may extend somewhat further depending on the buffer provided for the shelf object.

Similarly, height 1620 extends at least to the height of that fence's corresponding shelf object and, in some circumstances, may extend somewhat further depending on the corresponding buffer. In some cases, a first object in the environment may be associated with an unbounded (height-wise) bounding fence while a second object in the environment may be associated with a bounded (height-wise) bounding fence. Bounding or restricting the height of the fence may be useful in scenarios where the object is short enough that a user can simply walk over the object without exerting much effort.

In some cases, a bounding fence may overlap with another bounding fence or may overlap another virtual image/hologram. Additionally, objects may also extend from a ceiling downward. As such, bounding fences may originate at a ceiling or upward location and may extend downward a determined distance. In some implementations, an object may extend outward from a side wall. As a result, bounding fences may originate on a side wall and may extend laterally outward (i.e. perpendicular to the gravity vector).

The visual appearance of the bounding fences can vary or change as well. In some cases, the bounding fences are at least partially transparent so that the underlying object is at least partially visible through the bounding fence. For instance, the bounding fence may be 10%, 20%, 30%, 40%, 50%, 60%, 70%, 80%, or even 90% transparent. In other cases, the bounding fence may not be transparent and instead may entirely or completely occlude the underlying object. A descriptive text label may also be visually presented near the fence. For instance, when the bounding fence entirely occludes the underlying object, such as the shelf unit, the HMD may visually render the following text with the bounding fence: "Shelving Unit." In some cases, the text may entirely or partially overlap the bounding fence. In other cases, the text may not overlap the bounding fence but instead may be visually rendered near or proximate to the bounding fence.

As shown in FIG. 16, there are at least two virtual objects/holograms. For instance, fence 1615 may constitute a first virtual object and fence 1625 may constitute a second virtual object. Similar to the fence 1615, the fence 1625 is rendered in the mixed-reality scene/environment and is operating as a second bounding fence for a second object (e.g., the shelving unit) in the environment. Furthermore, as represented by the diagonal lines for fence 1625, fence 1625 may be visually distinguished from fence 1615, which includes a dot pattern background. Of course, any type of visual distinction may be used. In some cases, the distinction may occur through use of different colors, patterns, animations, or even holographic textures. For instance, fence 1625 may include an ocean-wave-like surface extending from the floor to the ceiling. In some cases, the visual distinction may include an animation (e.g., lines flowing in a certain direction, rain falling from the top, etc.). As such, visually distinguishing the second virtual object (e.g., the bounding fence) from a first virtual object (e.g., another bounding fence) may be performed with at least one of a different color, animation, pattern, or texture.

In some implementations, different object types may be assigned different bounding fence visualizations. As a consequence, visually distinguishing the different bounding fences may be based on the determined types of the objects.

Figure 17:
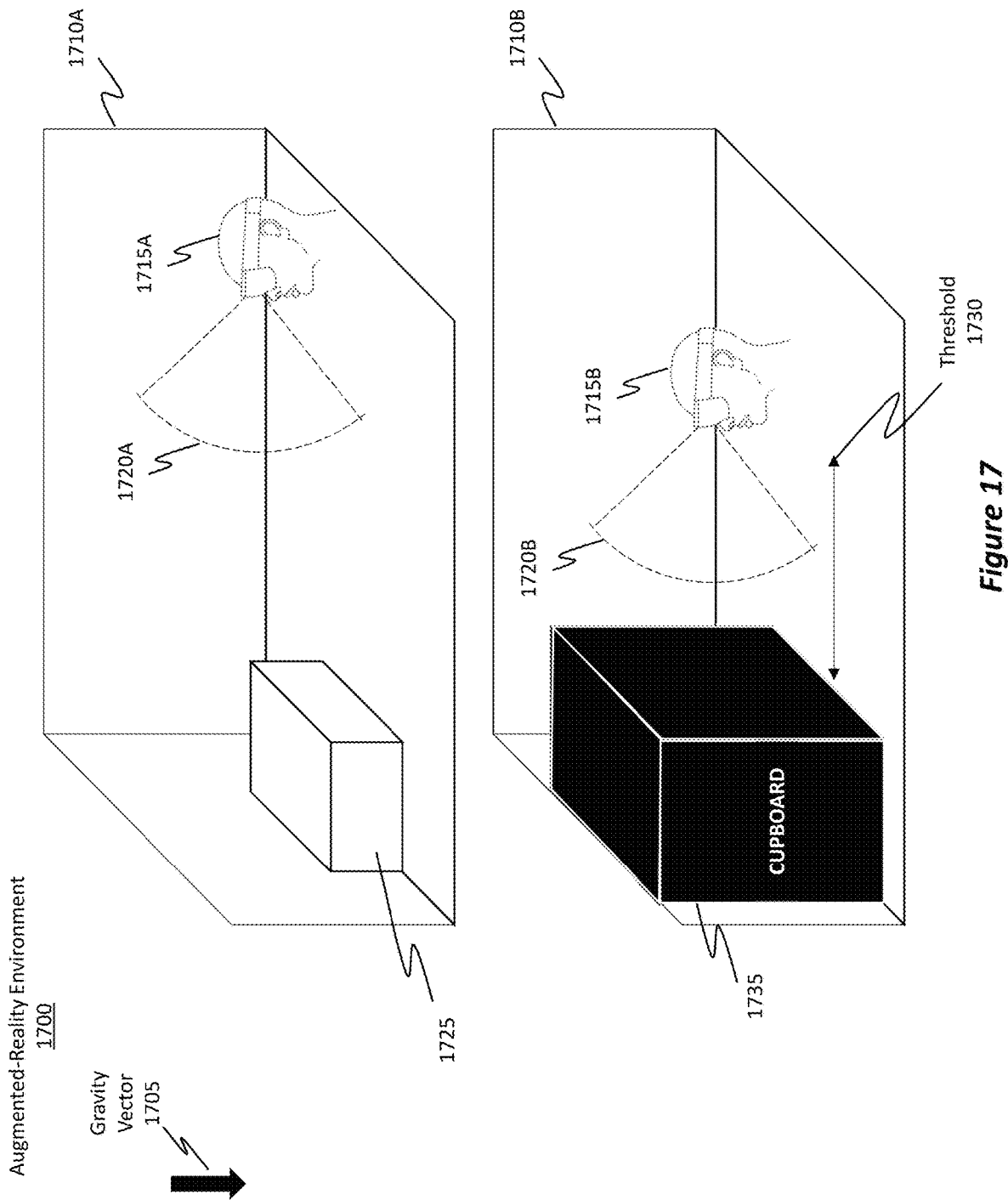
FIG. 17 illustrates how certain events can trigger the HMD to render bounding fences.
Figure 18:
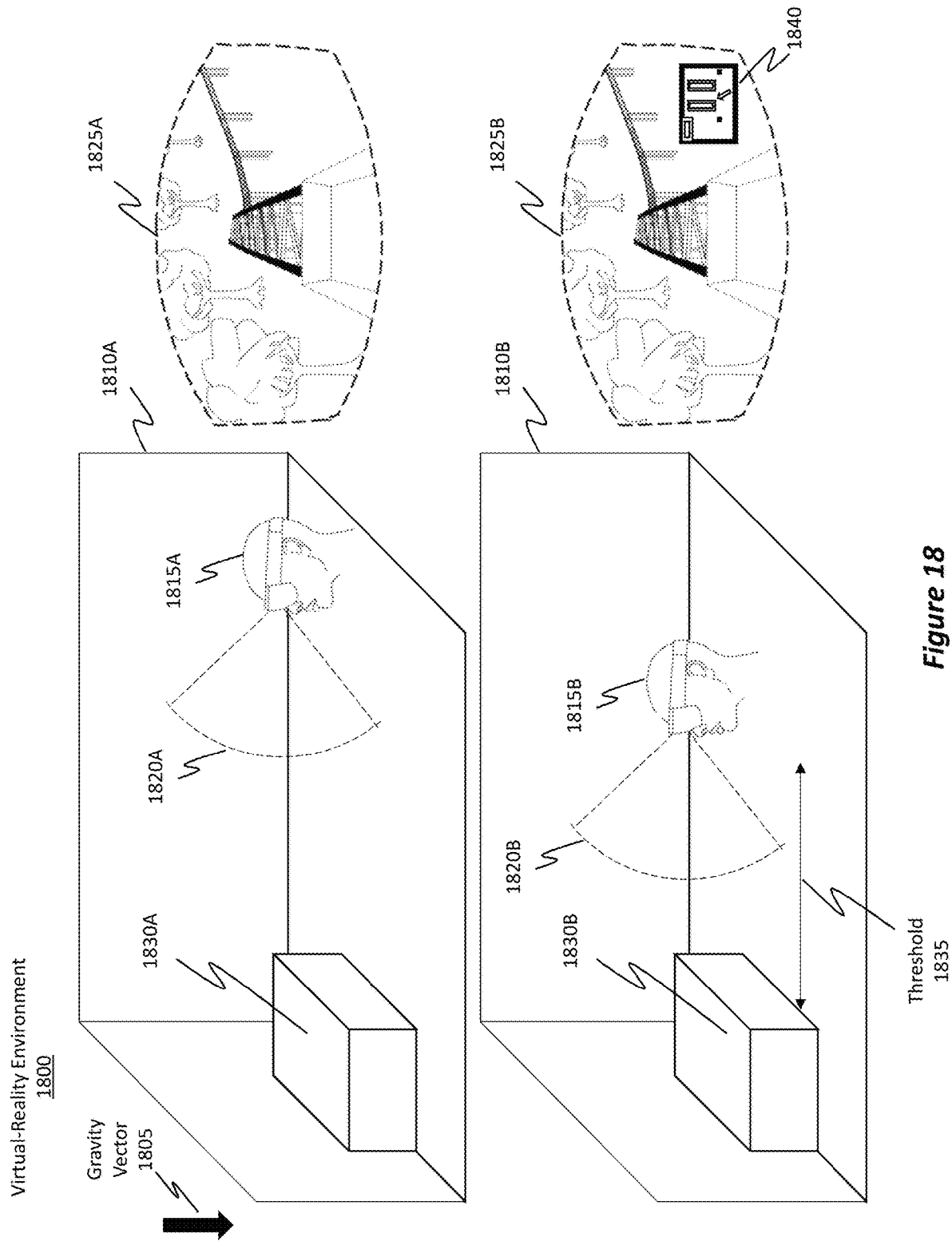
FIG. 18 illustrates another example scenario in which an event triggered the HMD to render a visualization of the bounding fences.

FIGS. 17 and 18 illustrate example scenarios in which the occurrence of a triggering event or condition causes the HMD to display the bounding fences. Specifically, FIG. 17 shows an augmented-reality environment 1700 and a gravity vector 1705. In scenario 1710A, the user 1715A is viewing content within a FOV 1720A. Here, user 1715A is not sufficiently proximate to the object 1725 (i.e. a cupboard) to trigger the display of a bounding fence.

In contrast, in scenario 1710B, the user 1715B (viewing content via FOV 1720B) is now physically closer to the object and is within a particular distance threshold 1730. Because of this closer proximity, the user's HMD was triggered to display a bounding fence 1735 around the object. In this particular scenario, the bounding fence 1735 is not transparent but rather is opaque. Furthermore, in this particular scenario, the HMD is also rendering descriptive text (e.g., "CUPBOARD") to describe the underlying object, as described earlier. By displaying bounding fence 1735, the user 1715B will be alerted as to the presence and proximity of the underlying cupboard object.

FIG. 18 illustrates a similar circumstance, but in the context of a virtual-reality environment 1800, which includes a gravity vector 1805. In scenario 1810A, the user 1815A is viewing content through a FOV 1820A. Specifically, the user is viewing the VR scene 1825A. In this scenario, the user 1815A is not sufficiently near the object 1830A. Consequently, the VR scene 1825A is not displaying a bird's eye perspective of the real-world environment.

In scenario 1810B, user 1815B is viewing content in the FOV 1820B. This content includes the VR scene 1825B. Furthermore, the real-world environment includes object 1830B. Because user 1815B is physically within a distance threshold 1835 of the object 1830B, the user's HMD was triggered to display the bird's eye perspective 1840 in the VR scene 1825B. As such, the user 1815B may be alerted that he/she is physically near a real-world object. This alert will allow the user 1815B to avoid colliding with object 1830B.

Example Method(s)

The following discussion now refers to a number of method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 19:
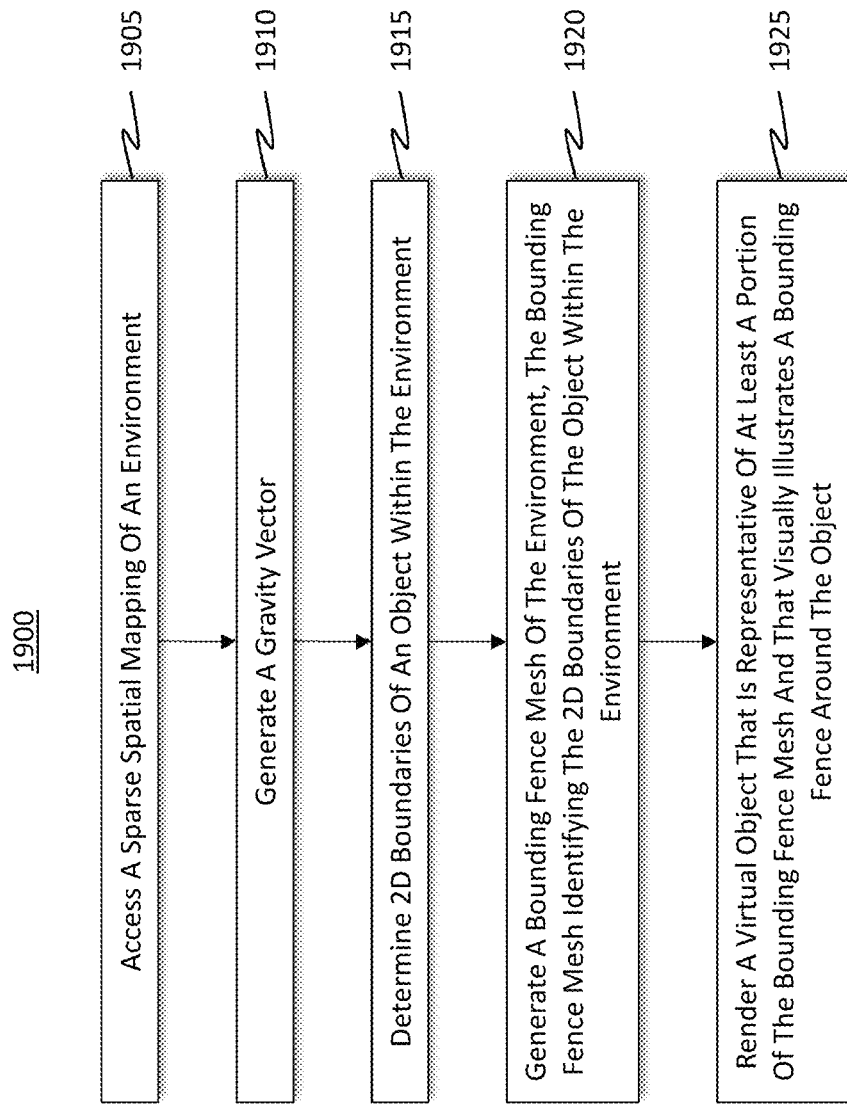
FIG. 19 illustrates a flowchart of acts associated with exemplary methods for displaying bounding fences in a mixed-reality environment.

FIG. 19 illustrates a flowchart of an example method 1900 for dynamically generating and rendering an object bounding fence (e.g., any of the bounding fences discussed thus far) in an MR scene/environment. Initially, method 1900 includes an act 1905 of accessing a sparse spatial mapping of an environment. As described earlier, this sparse spatial mapping is considered to be "sparse" because it includes incomplete surface and texture data for real-world objects located within a user's real-world environment. Although the sparse spatial mapping includes incomplete data, it nevertheless still includes a sufficient amount of perimeter edge data, which describes one or more perimeter edge(s) of an object located within the environment, in order to adequately detect the boundaries of the object.

Method 1900 then includes an act 1910 of generating a gravity vector of a head-mounted device (HMD). This HMD is operating in the environment and is displaying a mixed-reality scene. Furthermore, the HMD may include any number of IMUs, which may be used to determine the gravity vector.

Based on the perimeter edge data and the gravity vector, method 1900 then includes an act 1915 of determining two-dimensional (2D) boundaries of the object within the environment. In this regard, the embodiments operate to generate a 2D representation of a 3D object. Additionally, method 1900 includes an act 1920 of generating a bounding fence mesh (e.g., a 2D mesh or a 2D spatial mapping) of the environment. This bounding fence mesh identifies the 2D boundaries of the object within the environment. The bird's eye perspective 1200 of FIG. 12 can constitute this 2D spatial mapping.

Finally, method 1900 includes an act 1925 of rendering, within the mixed-reality scene, a virtual object that is representative of at least a portion of the bounding fence mesh and that visually illustrates a bounding fence around the object. In some implementations, the virtual object is a visualization of the bird's eye perspective (i.e. a 2D bird's eye view or a plan view) discussed throughout this disclosure (e.g., bird's eye perspective 1200 of FIG. 12). In some cases, the virtual object additionally includes one or more rectangular cuboids/3D voxels, such as fences 1530, 1535, 1540, and 1545 in FIG. 15.

Accordingly, the disclosed embodiments provide for an improved technique to identify objects within an environment. This improved technique also helps users avoid those objects. In doing so, the user's experience with the HMD is significantly improved. Additionally, by using a sparse spatial mapping and by translating a 3D problem into a 2D problem and then providing a 2D solution to the 2D problem, the embodiments enable the HMD to use less processing and less power. As such, by practicing the disclosed principles, the battery lifespan of the HMD can be lengthened, which lengthening will also improve the user's experience.

It will be appreciated that as new areas of an environment are scanned by the HMD's camera system, then bounding fences can also be displayed for any objects in those new areas. As an example, suppose a user is backing up towards a wall. In this example, the space between the user and the wall had already been previously mapped. Using the mapping data, the embodiments are able to display the bird's eye perspective and/or other bounding fences. In this regard, the embodiments are able to generate a bounding fence mesh in which the HMD generates an outline of the plan or layout of the environment (i.e. a type of map of the environment), including objects within that environment. All of this information can be utilized in order to provide a 2D view of that environment to the user. Accordingly, the user can be made aware of objects located to his/her blind spots, including areas to his/her left, right, and back.

In some implementations, the embodiments may utilize a distributed and shared spatial mapping of the user's environment, where multiple users may be in the same environment and where these multiple users may all be contributing data to the shared spatial mapping (i.e. the data is being fused together). Furthermore, the users' HMDs can communicate with one another or detect one another, and indicators representative of the users (e.g., indicator 1230) can each be displayed on the visualization of the 2D bird's eye perspective.

Example Computer System(s)

Figure 20:
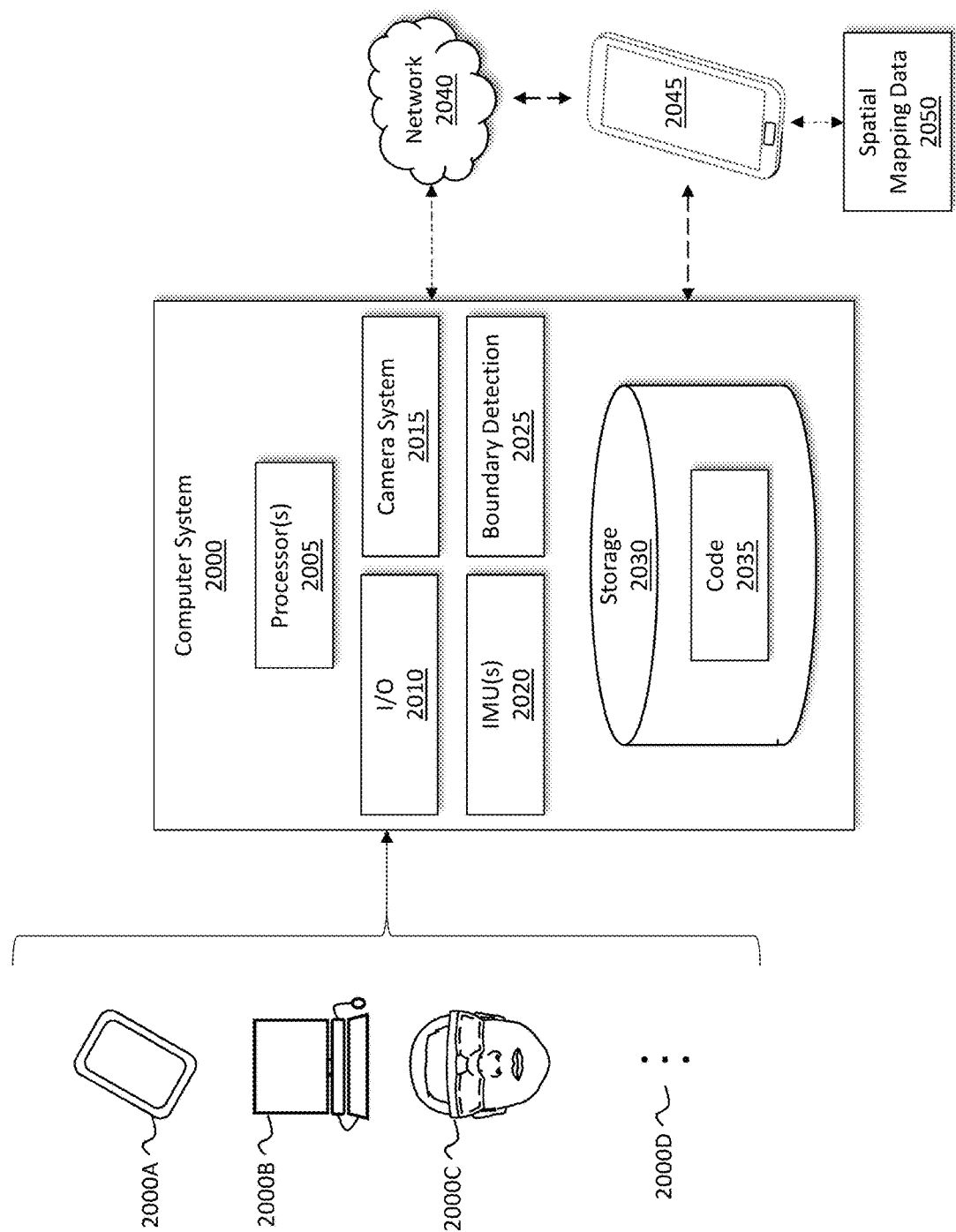
FIG. 20 illustrates an example computer system that may include or be used to perform aspects of the disclosed and claimed embodiments.

Attention will now be directed to FIG. 20 which illustrates an example computer system 2000 that may include and/or be used to perform the operations described herein. In particular, this computer system 2000 may be in the form of the MR systems/devices that were described earlier. As such, the computer system may be one of the following: a virtual-reality system or an augmented-reality system.

Computer system 2000 may take various different forms. For example, in FIG. 20, computer system 2000 may be embodied as a tablet 2000A, a desktop 2000B, or an HMD 2000C (with a corresponding wearable display), such as those described throughout this disclosure. The ellipsis 2000D demonstrates that computer system 2000 may be embodied in any form.

Computer system 2000 may also be a distributed system that includes one or more connected computing components/ devices that are in communication with computer system 2000, a laptop computer, a mobile phone, a server, a data center, and/or any other computer system. The ellipsis 2000D also indicates that other system subcomponents may be included or attached with the computer system 2000, including, for example, sensors that are configured to detect sensor data such as user attributes (e.g., heart rate sensors), as well as sensors like cameras and other sensors that are configured to detect sensor data such as environmental conditions and location/positioning (e.g., clocks, pressure sensors, temperature sensors, gyroscopes, accelerometers and so forth), all of which sensor data may comprise different types of information used during application of the disclosed embodiments. Some of the embodiments are implemented as handheld devices or handheld depth cameras. Some embodiments are also operable in robotics, drones, ambient settings, and any type of mobile phone.

In its most basic configuration, computer system 2000 includes various different components. FIG. 20 shows that computer system 2000 includes at least one processor(s) 2005 (aka a "hardware processing unit"), input/output ("I/O") 2010, camera system 2015 (which is representative of camera system 605 of FIG. 6), IMU(s) 2020, a boundary detection 2025, and storage 2030.

I/O 2010 may include any number of input/output devices, including wearable or handheld devices. I/O 2010 may also include a wearable display, which may be used to render virtual content. Camera system 2015 may include any number of cameras, including head tracking, hand tracking, depth detection, or any other type of camera. These cameras may be configured in the manner described earlier, and the camera system 2015 may perform any of the disclosed scanning or head tracking operations. Similarly, IMU(s) 2020 are configured in the manner discussed earlier.

Boundary detection 2025 is able to use the camera data from the camera system 2015 to generate a surface mesh, or spatial mapping, of an environment. In this regard, the boundary detection 2025, the camera system 2015, and/or the processor(s) 2005 may be configured to perform the disclosed operations.

Storage 2030 is shown as including executable code/ instructions 2035. The executable code/instructions 2035 represent instructions that are executable by computer system 2000 to perform the disclosed operations, such as those described in the method of FIG. 19.

Storage 2030 may be physical system memory, which may be volatile, non-volatile, or some combination of the two. The term "memory" may also be used herein to refer to non-volatile mass storage such as physical storage media. If computer system 2000 is distributed, the processing, memory, and/or storage capability may be distributed as well. As used herein, the term "executable module," "executable component," or even "component" can refer to software objects, routines, or methods that may be executed on computer system 2000. The different components, modules, engines, and services described herein may be implemented as objects or processors that execute on computer system 2000 (e.g. as separate threads).

The disclosed embodiments may comprise or utilize a special-purpose or general-purpose computer including computer hardware, such as, for example, one or more processors (such as processor(s) 2005) and system memory (such as storage 2030), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 2000 may also be connected (via a wired or wireless connection) to external sensors (e.g., one or more remote cameras, accelerometers, gyroscopes, acoustic sensors, magnetometers, etc.) or devices via a network 2040. For example, computer system 2000 can communicate with a handheld device 2045 that includes spatial mapping data 2050. This spatial mapping data 2050 may be used to augment or supplement any spatial mapping data accessed or generated by computer system 2000.

Furthermore, computer system 2000 may also be connected through one or more wired or wireless networks 2040 to remote/separate computer systems(s) that are configured to perform any of the processing described with regard to computer system 2000.

During use, a user of computer system 2000 is able to perceive information (e.g., an MR scene/environment (including VR or AR)) through a display screen that is included with the I/O 2010 of computer system 2000 and that is visible to the user. The I/O 2010 and sensors with the I/O 2010 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the mixed-reality environment.

A graphics rendering engine may also be configured, with processor(s) 2005, to render one or more virtual objects within an MR scene. As a result, the virtual objects accurately move in response to a movement of the user and/or in response to user input as the user interacts within the virtual scene.

A "network," like the network 2040 shown in FIG. 20, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 2000 will include one or more communication channels that are used to communicate with the network 2040. Transmissions media include a network that can be used to carry data or desired program code means in the form of computer-executable instructions or in the form of data structures.

Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor(s) 2005). For example, and without limitation, illustrative types of hardware logic components that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically generating and rendering an object bounding fence in a mixed-reality scene, the method comprising:
   accessing a spatial mapping of an environment, the spatial mapping including perimeter edge data describing one or more perimeter edge(s) of an object located within the environment;
   generating a gravity vector of a head-mounted device (HMD) that is operating in the environment and that is displaying a mixed-reality scene;
   based on the perimeter edge data and the gravity vector, determining two-dimensional (2D) boundaries of the object within the environment;
   generating a bounding fence mesh of the environment, the bounding fence mesh identifying the 2D boundaries of the object within the environment; and
   rendering, within the mixed-reality scene, a virtual object that is representative of at least a portion of the bounding fence mesh and that visually illustrates a bounding fence around the object, wherein the bounding fence is defined by the 2D boundaries of the object to form a 2D planar area surrounding the object relative to the gravity vector.

2. The method of claim 1, wherein the perimeter edge data describes a portion, but not all, of the one or more perimeter edge(s) of the object such that the perimeter edge data constitutes incomplete data, and wherein the spatial mapping is a sparse spatial mapping as a result of including the incomplete data for the object.

3. The method of claim 1, wherein the virtual object includes a visualization of a 2D bird's eye view of the environment.

4. The method of claim 1, wherein the spatial mapping is a sparse spatial mapping and is generated using a passive stereo camera system.

5. The method of claim 4, wherein the passive stereo camera system is included as a part of a head-tracking system of the HMD.

6. The method of claim 1, wherein the gravity vector is generated based on data obtained from an inertial measurement unit (IMU).

7. The method of claim 1, wherein the bounding fence further includes a rectangular cuboid whose length and width are defined by the 2D boundaries of the object and whose height extends upwardly in an unbounded direction perpendicular to the 2D planar area and parallel to the gravity vector.

8. The method of claim 1, wherein the bounding fence further includes a rectangular cuboid whose length and width are defined by the 2D boundaries of the object and whose height extends upwardly in an bounded direction perpendicular to the 2D planar area and parallel to the gravity vector, the height extending at least to a height of the object such that the rectangular cuboid entirely envelopes the object.

9. The method of claim 1, wherein a buffer is provided between the bounding fence and the 2D boundaries of the object such that an area defined by the bounding fence is larger than an area defined by the 2D boundaries of the object.

10. A computer system comprising:
    one or more processor(s); and
    one or more computer-readable hardware storage device(s) having stored thereon computer-executable instructions that are executable by the one or more processor(s) to cause the computer system to dynamically generate and render an object bounding fence in a mixed-reality scene by causing the computer system to at least:
  access a sparse spatial mapping of an environment, the sparse spatial mapping including perimeter edge data describing one or more perimeter edge(s) of an object located within the environment;
  generate a gravity vector of a head-mounted device (HMD) that is operating in the environment and that is displaying a mixed-reality scene;
  based on the perimeter edge data and the gravity vector, determine two-dimensional (2D) boundaries of the object within the environment;
  generate a bounding fence mesh of the environment, the bounding fence mesh identifying the 2D boundaries of the object within the environment; and
  render, within the mixed-reality scene, a virtual object that is representative of at least a portion of the bounding fence mesh and that visually illustrates a bounding fence around the object, wherein a second virtual object is rendered in the mixed-reality scene, the second virtual object operating as a second bounding fence for a second object included in the environment.

11. The computer system of claim 10, wherein the second virtual object is visually distinguished from the virtual object.

12. The computer system of claim 11, wherein visually distinguishing the second virtual object from the virtual object is performed with at least one of a different color, texture, or animation.

13. The computer system of claim 11, wherein visually distinguishing the second virtual object from the virtual object is based on determined types of the object and the second object.

14. The computer system of claim 10, wherein rendering the virtual object is performed only in response to a triggering event.

15. The computer system of claim 14, wherein the triggering event occurs when the HMD is determined to be located within a pre-established threshold distance to the object in the environment.

16. The computer system of claim 10, wherein the computer system is one of the following: a virtual-reality system or an augmented-reality system.

17. A head-mounted device (HMD) comprising:
  a wearable display;
  one or more processor(s); and
  one or more computer-readable hardware storage device(s) having stored thereon computer-executable instructions that are executable by the one or more processor(s) to cause the HMD to dynamically generate and render an object bounding fence in a mixed-reality scene by causing the HMD to at least:
    access a sparse spatial mapping of an environment, the sparse spatial mapping including perimeter edge data describing one or more perimeter edge(s) of an object located within the environment;
    generate a gravity vector of the HMD, which is operating in the environment and which is displaying a mixed-reality scene on the wearable display;
    based on the perimeter edge data and the gravity vector, determine two-dimensional (2D) boundaries of the object within the environment;
    generate a bounding fence mesh of the environment, the bounding fence mesh identifying the 2D boundaries of the object within the environment; and
    render, within the mixed-reality scene on the wearable display, a virtual object that is representative of at least a portion of the bounding fence mesh and that visually illustrates a bounding fence around the object.

18. The HMD of claim 17, wherein the sparse spatial mapping is generated using one of the following: a motion stereo camera system, a passive stereo camera system, an active stereo camera system, an active time-of-flight, or an active structured light camera.

* * * * *